US012485447B2

(12) United States Patent
Fuller et al.

(10) Patent No.: US 12,485,447 B2
(45) Date of Patent: Dec. 2, 2025

(54) PIXELATED WATER DISPLAY AND DESIGN TOOLS THEREFOR

(71) Applicant: WET, Sun Valley, CA (US)

(72) Inventors: Mark Fuller, Sun Valley, CA (US); Gautam Rangan, Sun Valley, CA (US)

(73) Assignee: WET, Sun Valley, CA (US)

( * ) Notice: Subject to any disclaimer, the term of this patent is extended or adjusted under 35 U.S.C. 154(b) by 0 days.

(21) Appl. No.: 18/587,905

(22) Filed: Feb. 26, 2024

(65) Prior Publication Data

US 2024/0326081 A1 Oct. 3, 2024

Related U.S. Application Data

(63) Continuation of application No. 15/717,841, filed on Sep. 27, 2017, now Pat. No. 11,938,502.

(60) Provisional application No. 62/401,103, filed on Sep. 28, 2016.

(51) Int. Cl.

| | |
|---|---|
| ***B05B 17/08*** | (2006.01) |
| ***B05B 1/02*** | (2006.01) |
| ***B05B 1/12*** | (2006.01) |
| ***B05B 1/16*** | (2006.01) |
| ***B05B 12/02*** | (2006.01) |
| ***B05B 12/04*** | (2006.01) |
| ***H05B 47/115*** | (2020.01) |
| *B05B 15/65* | (2018.01) |
| *F21S 8/00* | (2006.01) |
| *F21S 10/00* | (2006.01) |
| *F21W 121/02* | (2006.01) |
| *F21Y 115/10* | (2016.01) |
| *H05B 47/155* | (2020.01) |

(52) U.S. Cl.

CPC ................ *B05B 17/08* (2013.01); *B05B 1/16* (2013.01); *B05B 1/169* (2013.01); *B05B 12/02* (2013.01); *B05B 12/04* (2013.01); *H05B 47/115* (2020.01); *B05B 1/02* (2013.01); *B05B 1/12* (2013.01); *B05B 15/65* (2018.02); *F21S 8/032* (2013.01); *F21S 10/002* (2013.01); *F21W 2121/02* (2013.01); *F21Y 2115/10* (2016.08); *H05B 47/155* (2020.01)

(58) Field of Classification Search

CPC ........... B05B 1/16; B05B 15/65; B05B 17/08; B05B 1/169; B05B 1/02; B05B 1/12; B05B 17/085; B05B 12/02; F21W 2121/02

See application file for complete search history.

(56) References Cited

U.S. PATENT DOCUMENTS

2013/0214056 A1 * 8/2013 Schoeren ................ B05B 17/08
239/17

* cited by examiner

*Primary Examiner* — Christopher R Dandridge
(74) *Attorney, Agent, or Firm* — Maceiko IP

(57) ABSTRACT

A water display including a number of pixels or manifolds that may include water nozzles to emit streams of water and/or other utilities such as lighting is described. The water streams may be pixelated so as to provide a high resolution waveform or other choreography. The choreography transitions between waveforms to provide the appearance of a cascading or undulating wave. A tool to design the water display and simulate its appearance is also described.

20 Claims, 26 Drawing Sheets

PIXELATED WATER DISPLAY AND DESIGN TOOLS THEREFOR

CROSS REFERENCE TO RELATED APPLICATION

This application is a continuation of U.S. application Ser. No. 15/717,841 filed on Sep. 27, 2017, which claimed priority to U.S. Provisional Application No. 62/401,103, filed Sep. 28, 2016. The foregoing applications are incorporated herein by reference as if fully set forth herein.

FIELD OF THE INVENTION

The field of the invention generally includes water and lighting displays and the manner in which such displays may be designed. This includes displays having a large number of water nozzles and/or nozzles arranged in a pixelated fashion that may provide versatility in display choreography, and novel tools to design, simulate and/or control the display.

BACKGROUND OF THE INVENTION

Water fountain and lighting displays have existed for some time. For example, the Fountains at the Bellagio Hotel in Las Vegas have entertained millions of people for years. More recently, the Dubai Fountains in the UAE have also become a major tourist attraction.

Though existing displays may include a number of nozzles or other water delivery devices, the appearance or choreography of the water display they may produce may be somewhat limited. This may result, for example, because of the type of nozzles, their location and/or spacing. This may also result from the display having an insufficient number of nozzles to provide the desired choreographies, or insufficient control over the manner in which the nozzles emit streams of water. Accordingly, there is a need for a display where the appearance and choreography of the display may be significantly varied.

As noted above, existing displays may include a number of nozzles. However, as the number of nozzles increases, the programming of such nozzles becomes more difficult. Accordingly, there is a need for a method by which large numbers of nozzles may be programmed to provide the desired appearance or choreography. There also exists a need to present or simulate the resulting appearance or choreography of the display to aid in the design process.

SUMMARY OF THE INVENTION

The current invention addresses the foregoing and other needs in the technology.

In an aspect of the invention, a display having nozzles or other water delivery devices arranged in a grid or a pixelated fashion is described. To this end, the nozzles may be positioned similar to pixels on a television screen, computer monitor or other pixelated surface or device. For example, the nozzles may be positioned relatively close together so that the streams of water they emit are also closely spaced to provide a high-resolution effect. In this manner, successive nozzles may emit water in gradually varying heights so as to provide a smooth, cascading or undulating appearance. The pixelated configuration of nozzles may also allow for many different choreographies; and the variation in choreographies may increase where a significant number of pixel nozzles are used.

Another aspect of the invention regards the manifold, housing, pixel or device that supports, contains or includes the nozzle. For example, each nozzle may reside in or be supported by a paver or other type of housing. As such, some or all of the pixels in the grid may comprise a paver or housing, and these manifolds, pavers or housings may be positioned adjacent or close to each other to form a surface or a floor of the display. This floor may be contiguous with a plaza or other surface surrounding the display.

In another aspect of the invention, the manifold, paver, housing or other device comprising the pixels in the grid may include other utilities, tools or effects. For example, the pixels may include a light source, different types of nozzles or other water emitting devices, motion sensors, gas lines to produce flames or other features. Where motion sensors are included in the pixels and the motions sensors detect movement or a certain weight, the nozzles in those pixels may be turned off so that they do not emit water, and observers may walk on them, vehicles may drive over them and/or they may be generally accessible. In a preferred embodiment, the features in each pixel may be individually controllable and/or may be synchronized to music or other effects.

Another aspect of the current invention involves tools that may be used to design the choreography of the display and/or present or simulate how the display would appear in operation. It is also preferred that this tool may be used to control the operation of the display. This aspect of the invention may include software.

Other aspects of the current invention are described herein.

BRIEF DESCRIPTION OF THE DRAWINGS

The following detailed description of the preferred embodiments may be better understood with references to the accompanying drawings, wherein:

FIGS. 5D-5F show a motion sensor feature.

DETAILED DESCRIPTION OF THE PREFERRED EMBODIMENTS

Figure 1A:
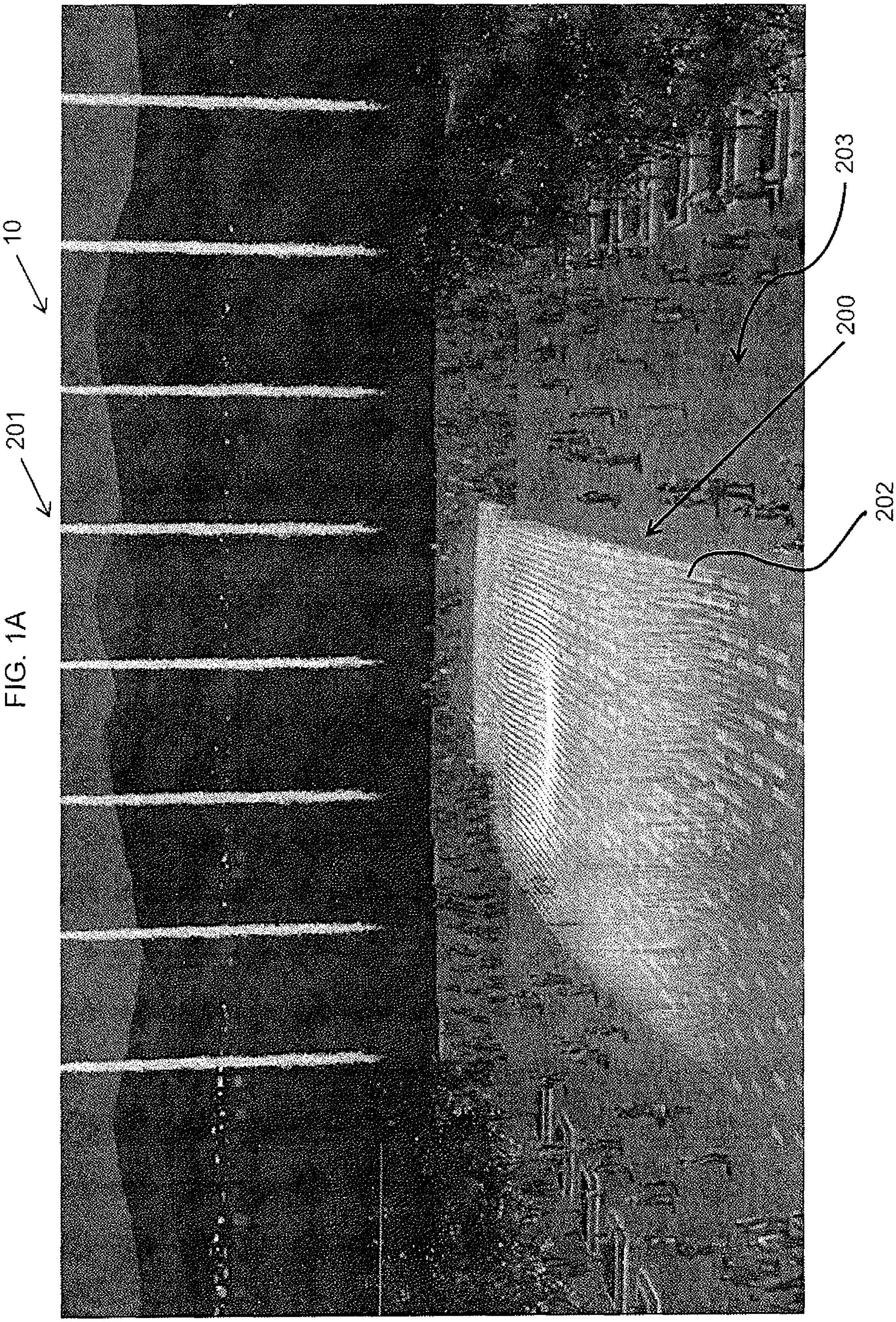
FIGS. 1A-1C are perspective views of a display at different times showing how the display choreography may transition over time.

The following detailed description is not intended to limit the current invention. Alternate embodiments and variations of the subject matter described herein will be apparent to those skilled in the art.

The display 10 of the current invention is now described with reference to the figures. Where the same or similar components appear in more than one figure, they are identified by the same or similar reference numerals.

As shown in the figures, display 10 may generally include a number of nozzles or other water delivery devices, lights and/or other utilities, tools or features. In general, display 10 preferably includes a number of individually controlled water nozzles or other water delivery devices that may emit streams of water and that may be positioned in close proximity to each other in a generally pixelated or matrix-like formation, grid or array. (Though the term “nozzle” is used herein, other water delivery devices such as shooters, misters and other devices that emit streams of water are included within the scope of the invention and may be used interchangeably with nozzles except where indicated.)

The water nozzles may each reside in individual manifolds or housings that are configured adjacent to each other. The pixelated or matrix-like formation of these manifolds or housings, and their respective nozzles and emitted water streams, may resemble pixels or elements in a grid. Within this formation, grid or pixelated array, some or all of the water nozzles may be controlled to emit a stream of water at variable heights such that the aggregate appearance of the water streams may form a variable profile or waveform of water. The nozzles are preferably individually controlled in choreographed fashion so that the height of the water emitted from certain nozzles in relation to other nozzles, produces an overall water waveform that may smoothly fluctuate or transition between a wide variety of shapes, forms and visual effects.

Figure 1B:
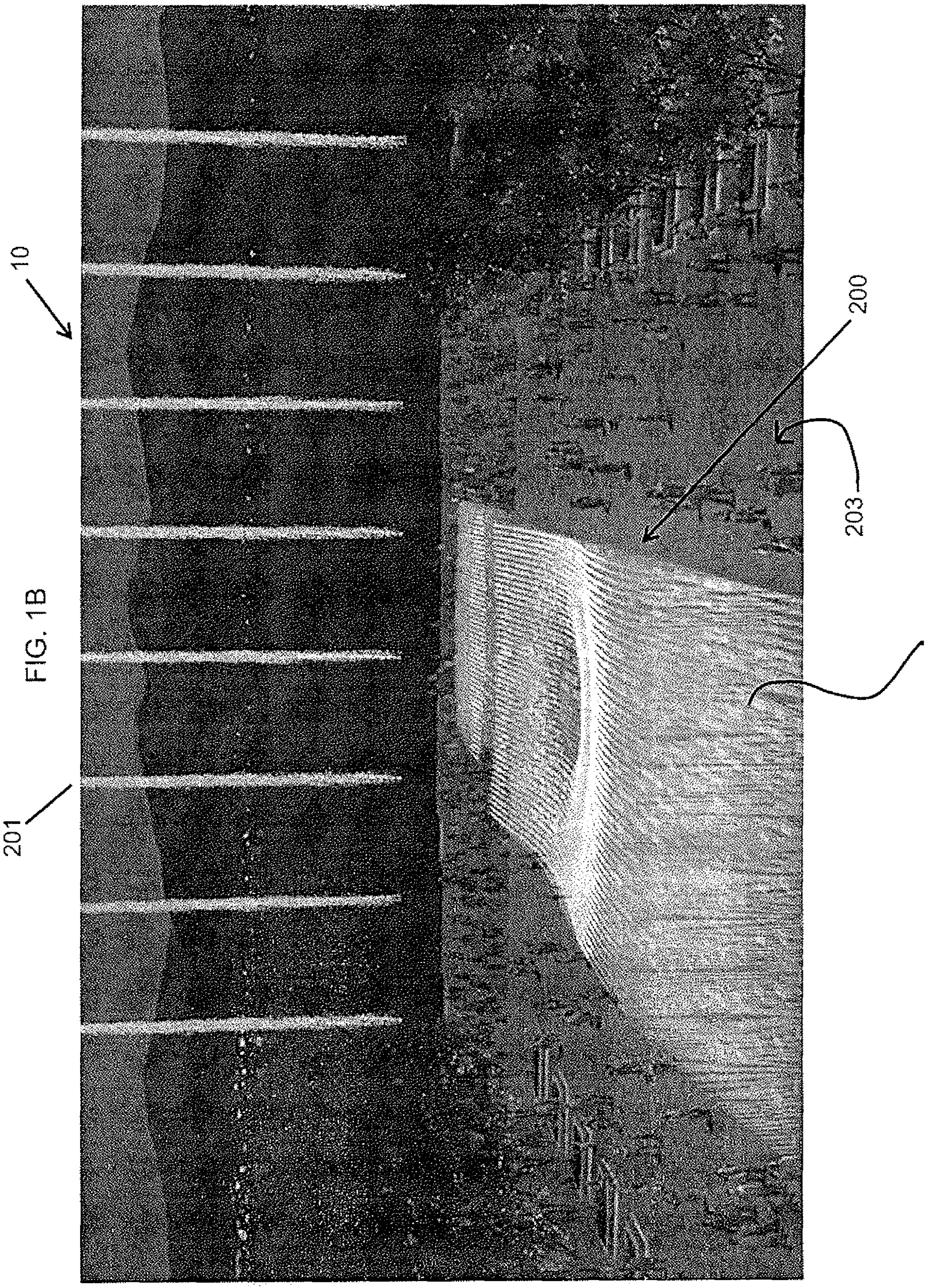
Figure 1C:
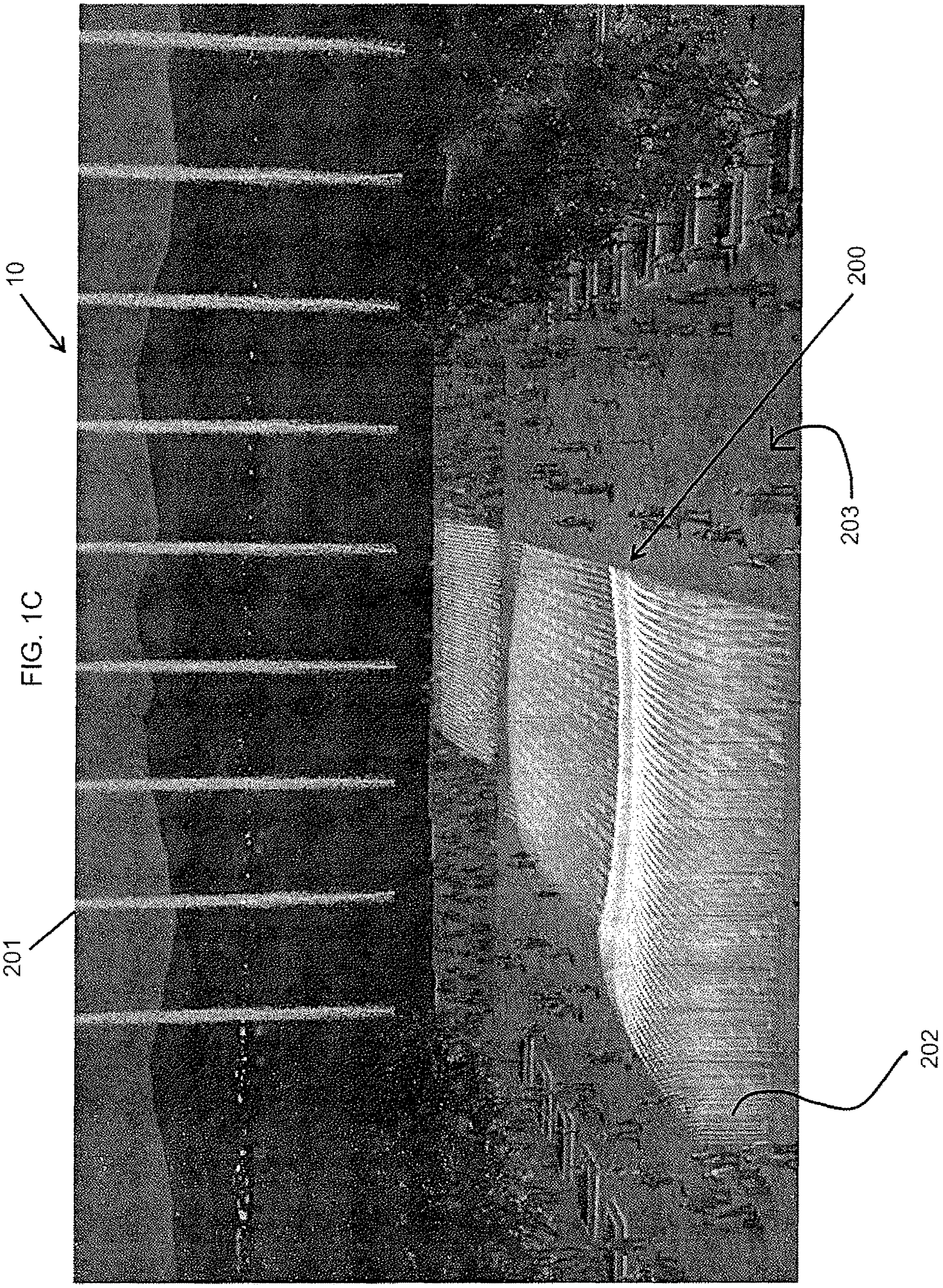

FIGS. 1A-1C show how the overall choreography or waveform 200 may transition over time. These figures also show how the individual streams of water emanating from individual pixels may contribute to the overall appearance, i.e., each water stream may form an individual water stream pixel 202 in the aggregate overall water waveform 200. As shown, the pixelated streams of water 202 may be turned on and off, and when turned on, the height of the water stream may be varied.

As discussed in more detail below, display 10 may contain different numbers of nozzles or pixels that may produce pixelated water streams. Larger displays may include thousands of nozzles or pixels, e.g., 10,000 pixels, which may provide a high-resolution appearance for gradual and smooth transitioning waveforms. As shown in FIGS. 1A-1C, for example, display 10 may provide a cascading or undulating wave choreography. However, it should be noted that fewer nozzles or pixels may be used while still providing significant versatility in the choreographies that may be provided by display 10.

Figure 2:
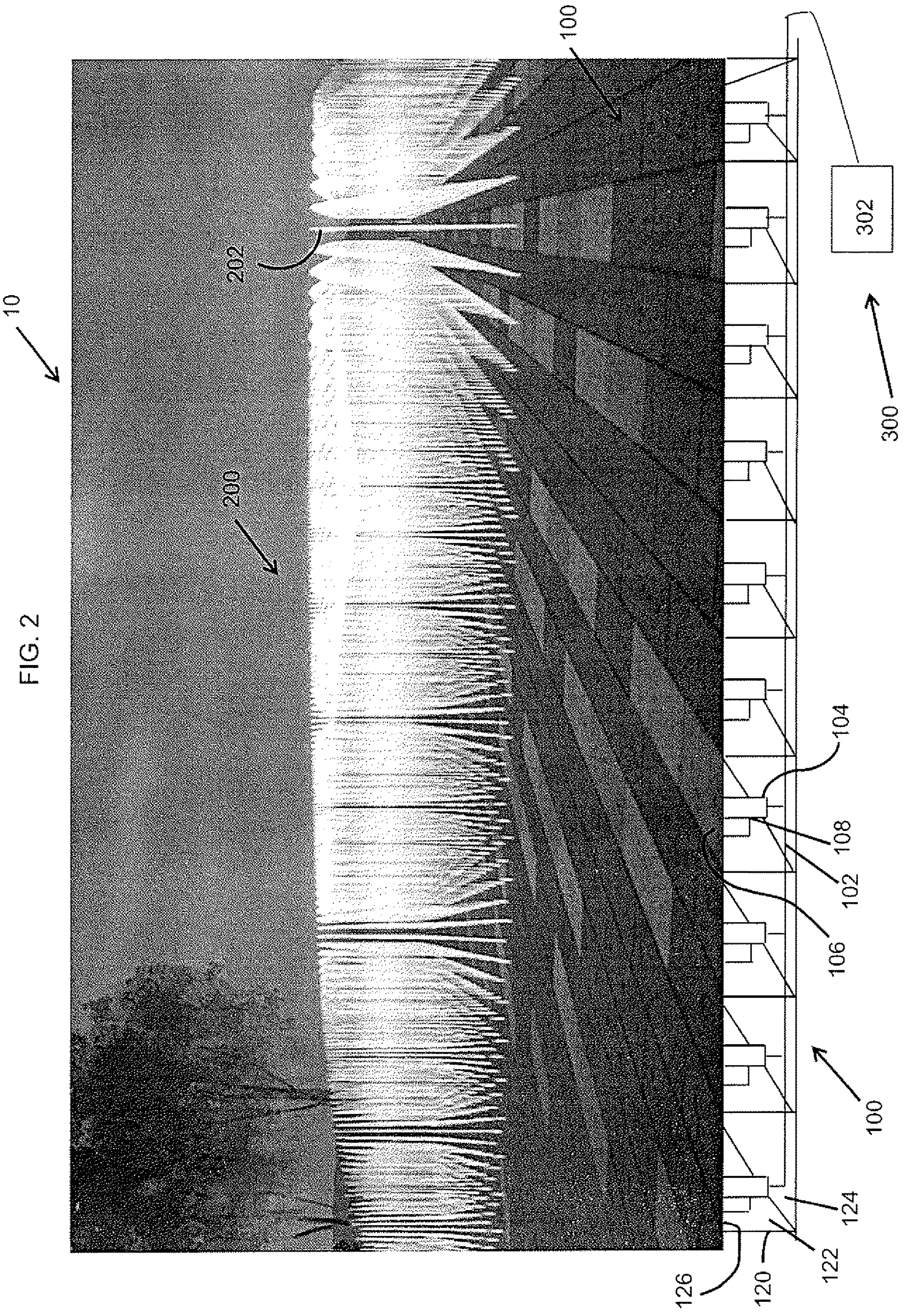
FIG. 2 is a perspective view of a display showing individual pixels, elements or modules, and how the pixels may appear from above the ground and how they may appear below the display floor.
Figure 4:
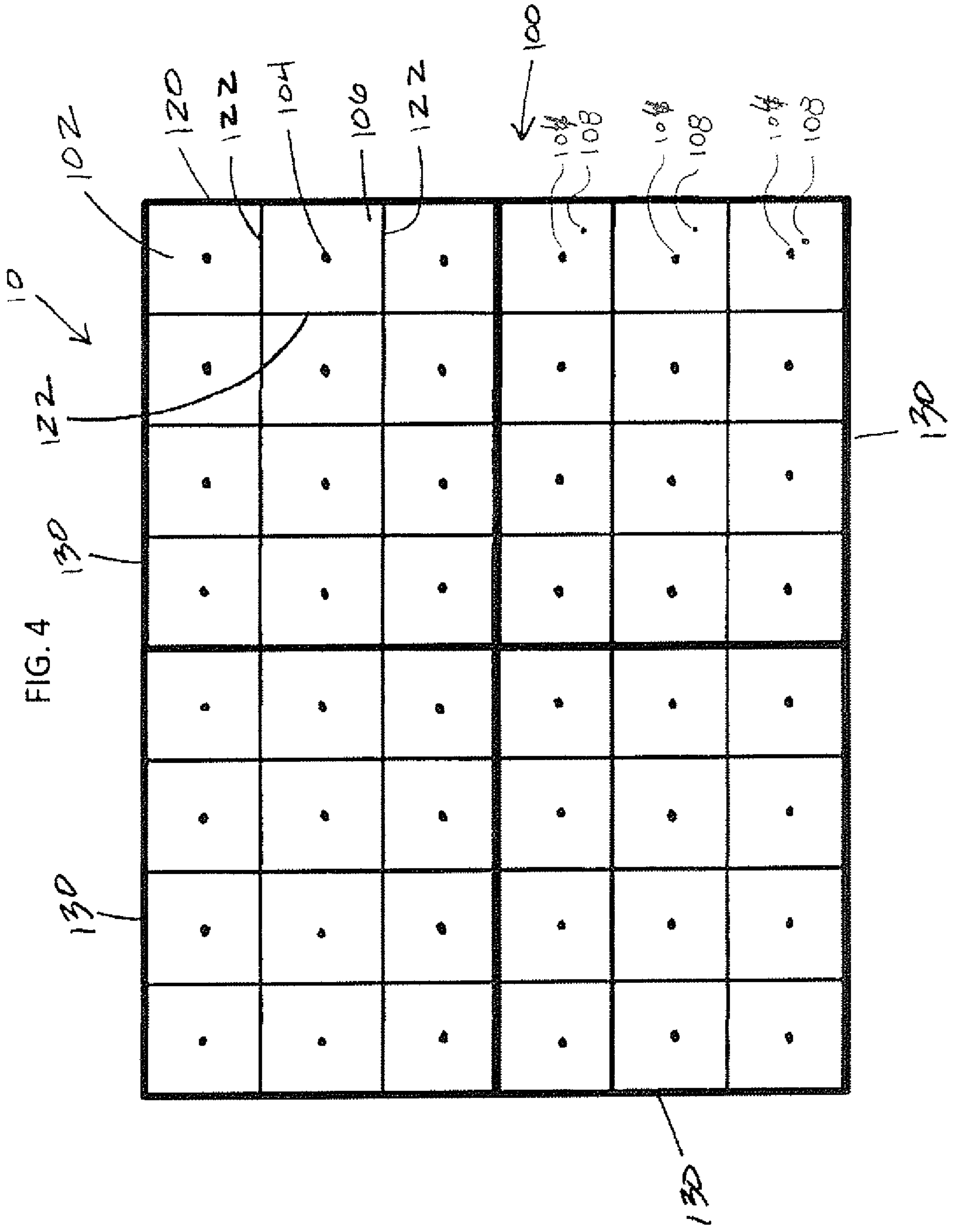
FIG. 4 is a top view of a grid, array or lattice arrangement of individual pixels, manifolds or element modules.

The pixelated nature of display 10 is now further described with reference to FIGS. 2 and 4. As shown, the floor or surface 100 of display 10 may generally comprise a grid or array of pixels, manifolds or element modules 102. Floor 100 may also be referred to as a matrix. In a preferred embodiment, pixels, manifolds or elements 102 may comprise pavers 106. As shown, pavers 106 may be located adjacent to each other to form the base or ground surface 100 of display 10. Surface 100 may comprise part of an overall plaza 203 as shown in FIGS. 1A-1C. In FIGS. 2 and 4, pavers 106 are shown as rectangles and squares, but other shapes may be used. As discussed later, gaps 122 may exist between pavers 106, as part of the structure that supports floor 100.

As shown in FIG. 2, pavers 106 may each form the manifold, pixel or element module 102, and may also extend below ground to house certain items as described more fully below. Each manifold, pixel or element module 102 may include at least one nozzle 104 that may reside in a hole, slot or other opening in paver 106, and that may emit a water stream upward. In connection with the pixelated configuration of display 10, pavers 106 may each provide individual water streams that may resemble water stream pixels 202 as shown in FIG. 2. With reference to FIGS. 1A-1C, these individual water stream pixels or pixelated water streams 202 may cumulatively form waveform 200.

Pixel or manifold 102 may also include light source 108 to provide illumination to water stream pixel 202. For example, an LED light may be positioned within a hole or other opening in paver 106 to illuminate the water stream pixel 202 emitting from that or other pavers 106. The pixelated water streams 202 may be emitted from various pixels or manifolds 102 at different times to effect the desired choreography. For example, FIG. 2 shows how nozzles 104 of element modules 102 in the foreground are not emitting water, while the element modules 102 in the rear of the figure are emitting water stream pixels 202.

As shown in FIG. 2, each manifold, pixel or element 102 may extend downward from floor 100 to a particular depth. The manner in which pixels 102, e.g., pavers 106, may be supported and the manner in which water, light or other utilities are provided to pavers 106, is discussed in more detail later. In any event, manifolds, pixels or element modules 102 may have a small form factor such that adjacent nozzles or water jets 104 may be spaced closely together across grid or element matrix 100 by virtue of the size of their respective pixels 102. This in turn allows water stream pixels 202 emitted from nozzles 104 to also be in close proximity. This preferably results in a high density of water stream pixels 202 per unit area across element matrix 100. As such, water steam pixels 202 may visually blend together to form a relatively high-resolution water waveform 200 as shown, e.g., in FIGS. 1A-1C. For example, FIGS. 1A-1C show that the top surface of water waveform 200 may be formed by the tips of individual water steam pixels 202, and that the resolution of water waveform 200 may depend on the spacing of water stream pixels 202.

The resolution of output or waveform 200 may resemble the output resolution of a printer as measured in dots per inch (dpi), where dpi refers to the physical dot density of an image when it is reproduced as a real physical entity, for example, printed onto paper. The higher the dpi, the higher the resolution of the image on the paper. Similarly, the closer the spacing of each water stream pixel 202 and the higher the density of water stream pixels 202 across grid, floor, surface or element matrix 100, the higher the resolution of the overall water waveforms 200. This may also be analogous to the resolution of a television screen, computer monitor or other pixelated surface.

As shown in FIGS. 1A-1C, the water waveforms 200 may generally have a high resolution such that top surfaces and general geometries of the waveforms 200 visually form three dimensional shapes with discernible surface characteristics, features and/or forms. For example, the water waveform 200 depicted in FIG. 1A may be a smooth curve of a wave with a dimple in the top of the waveform 200 that is clearly discernable. As stated above, the waveform 200 may controllably fluctuate from one geometric shape or appearance to another, and in one example, the waveform 200 may transition from the waveform 200 shown in FIG. 1A to the waveforms 200 shown in FIGS. 1B and 1C.

This may be accomplished by controlling each water nozzle or jet 104 individually such that the height of some or each individual water stream pixel 202 with respect to some or all of the others is controlled across the waveform 200. For the transition from the waveform 200 in FIG. 1A to the waveform 200 in FIGS. 1B and 1C, the water jets or nozzles 104 in the center region of waveform 200 in FIG. 1A may be controlled to reduce the height of their respective water stream pixels 202 such that the dimple in the center of the waveform 200 may generally widen and drop as shown.

It should be noted that some, most or all of the water jets or nozzles 104 across matrix 100 may be controlled in unison at the same time, and that certain water jets 104 may be controlled to lower or raise their water stream pixels 202 faster or slower, or by more or less distance, compared to other water jets 104. It should also be noted that the density of pixels 102, e.g., pavers 106, and their associated water stream pixels 202, may vary across grid 100. And as shown in FIGS. 1A-1C, display 10 may include other water streams such as streams 201 that may be spaced relatively far apart from each other.

As shown in FIG. 2, display 10 preferably includes control system 300 which may include controller 302 and which may control the height, velocity or other emission properties of each water stream pixel 202, as well as control other features includes in pixels 102, e.g., lighting, gas for flame, etc. It is preferred that control system 300 does so in real time, with accuracy and according to the desired choreography. In this manner, the contour of the dimple in waveform 200 in FIG. 1B may be smooth, and the transition from one shape or appearance to the next may be even and free of abrupt discontinuities, if desired, to provide a smooth, undulating or cascading appearance.

Controller 302 may include software that controls the various tools, utilities or features associated with each pixel or manifold 102. For example, control system 300 may control mechanisms associated with each individual water jet 104 to vary the output pressure of each water stream pixel 202, the valve opening leading to each water jet 104, the velocity of each water stream pixel 202 as it leaves nozzle 104, as well as other characteristics of each water stream pixel 202. As such, controller 302 preferably controls the height, width and other physical characteristics of each individual water stream pixel 202 in real time. This may occur by controller 302 sending appropriate signals to adjust or manipulate valves, actuators, pumps or other devices that may vary the water stream pixels 202 emanating from pixelated nozzles 104 of pixels or manifolds 102.

It is also preferred that controller 302 and/or control system 300 operate continuously and/or at sufficient speed such that the transformation of one water waveform 200 to another may be continuous, smooth and free of abrupt distortions (unless another type of transition is desired). For instance, controller 302 may control each individual water jet 104 at a sufficiently fast frames-per-second speed such that each water stream pixel 202 is set to a different position the number of times each second corresponding to the frames-per-second rate.

As noted above, display 10 may include a significant number of pixels, manifolds or modules 102 that produce water stream pixels 202 to create waveforms 200 with high resolution, and that may transition with a smooth, cascading or undulating appearance. To this end, control system 300 may provide any number of choreographies wherein each individual element module 102, and its mechanical components that control the water stream pixel 202 emitted therefrom, may emit water in various heights, pressures, velocities or with other characteristics. As such, display 10 may provide an almost infinite number of different and/or complex water waveforms 200 by intricately choreographing water stream pixels 202.

Figure 3A:
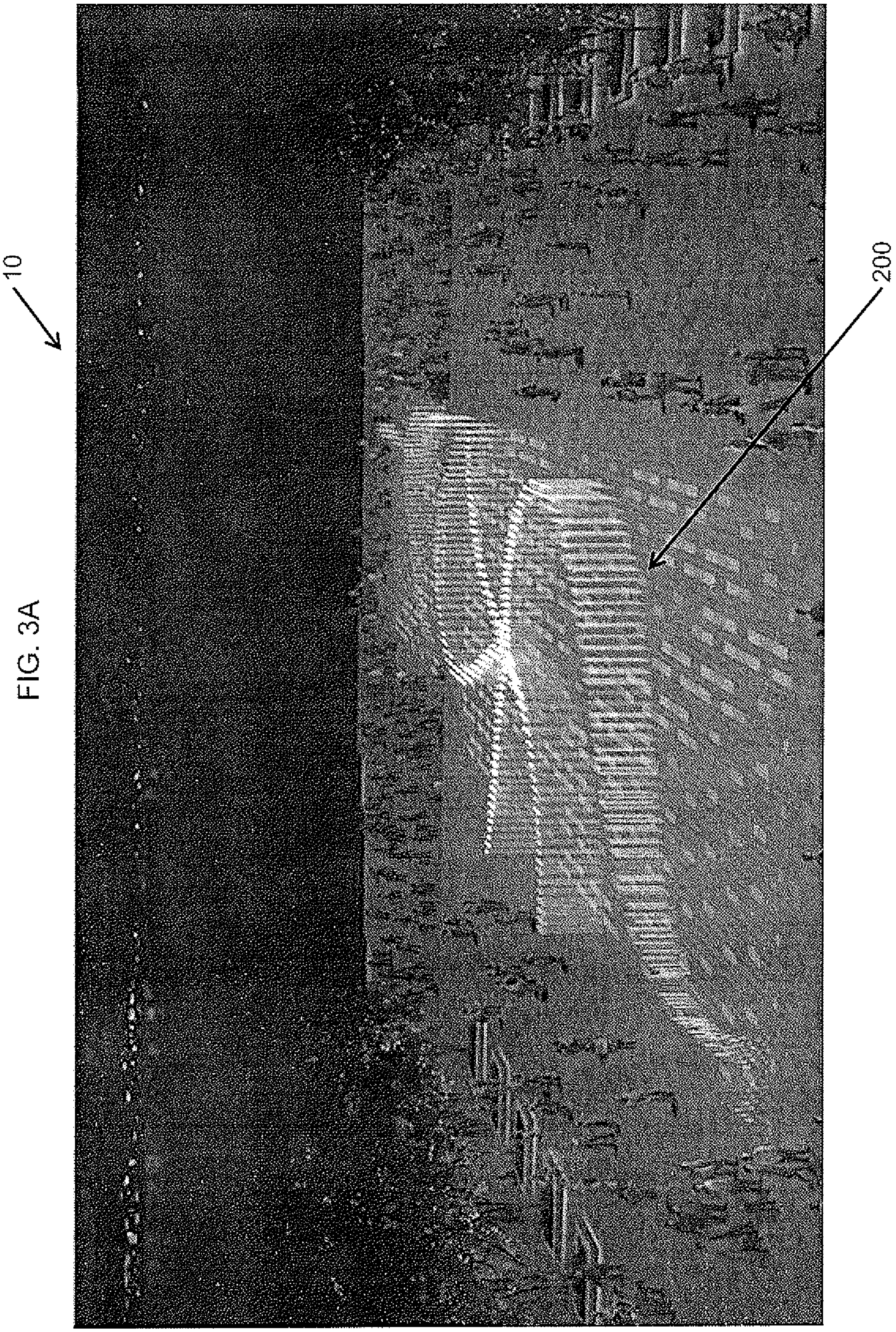
FIGS. 3A-3D are perspective views of a display at different times showing how the display choreography may transition over time.
Figure 3B:
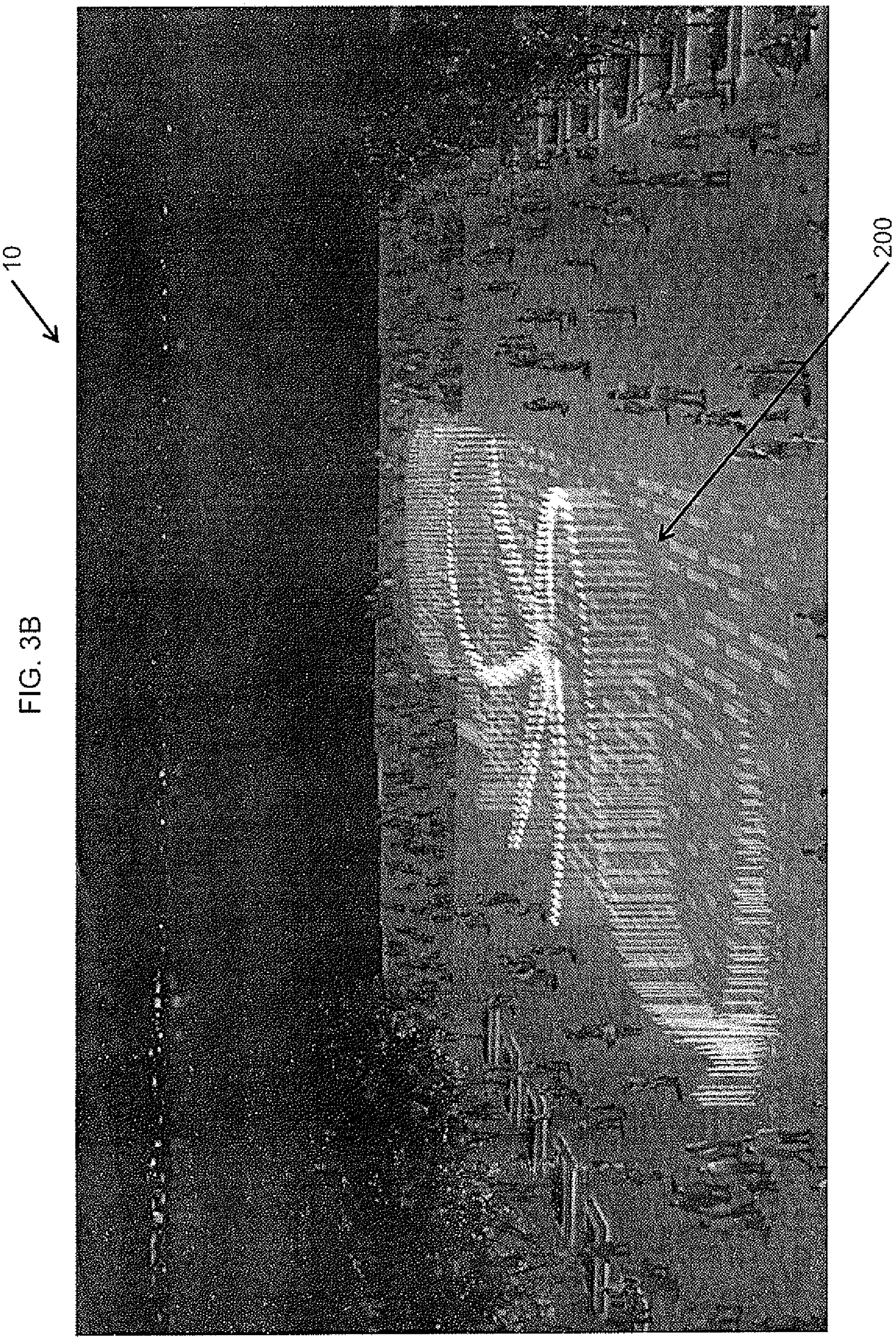
Figure 3C:
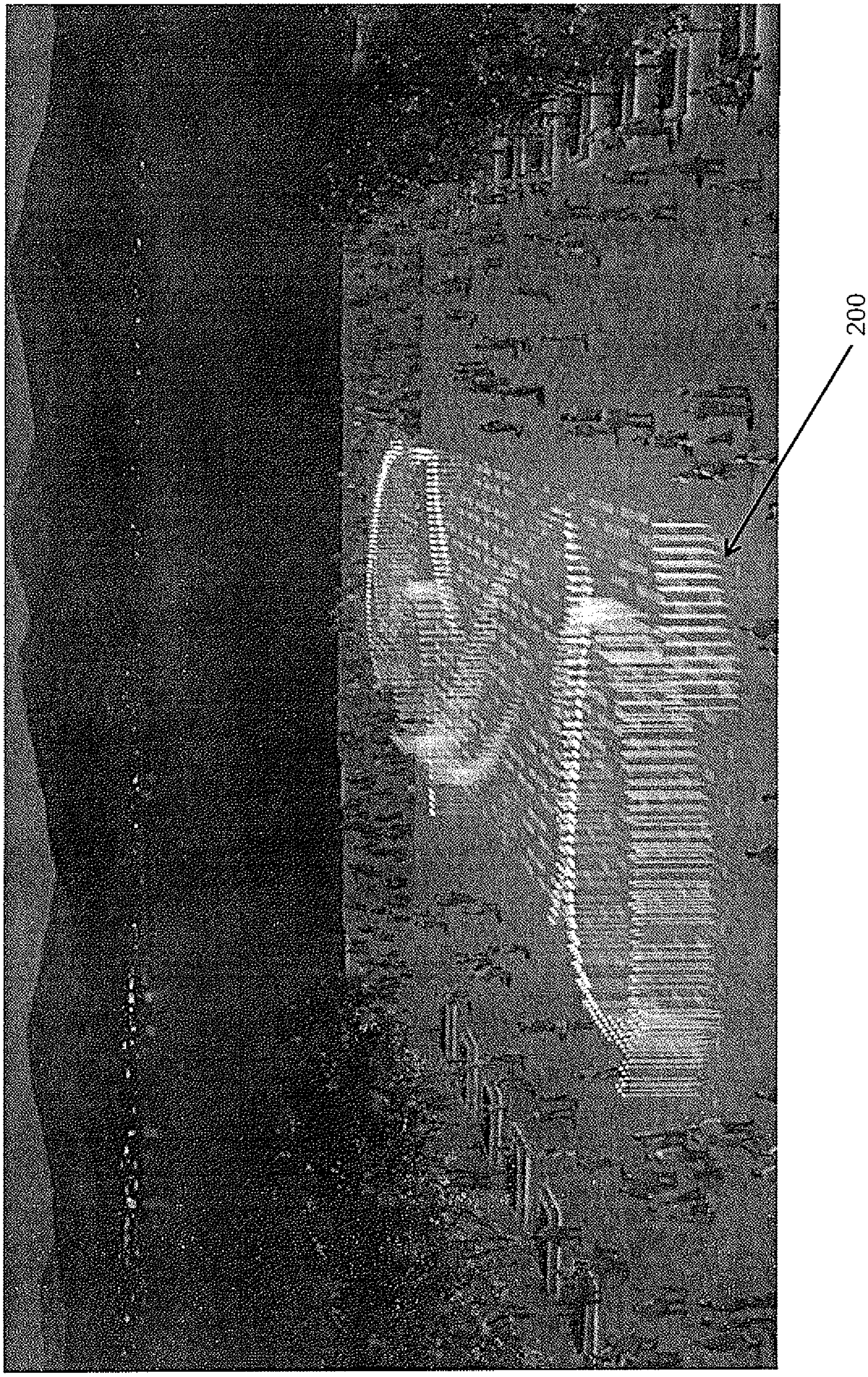
Figure 3D:
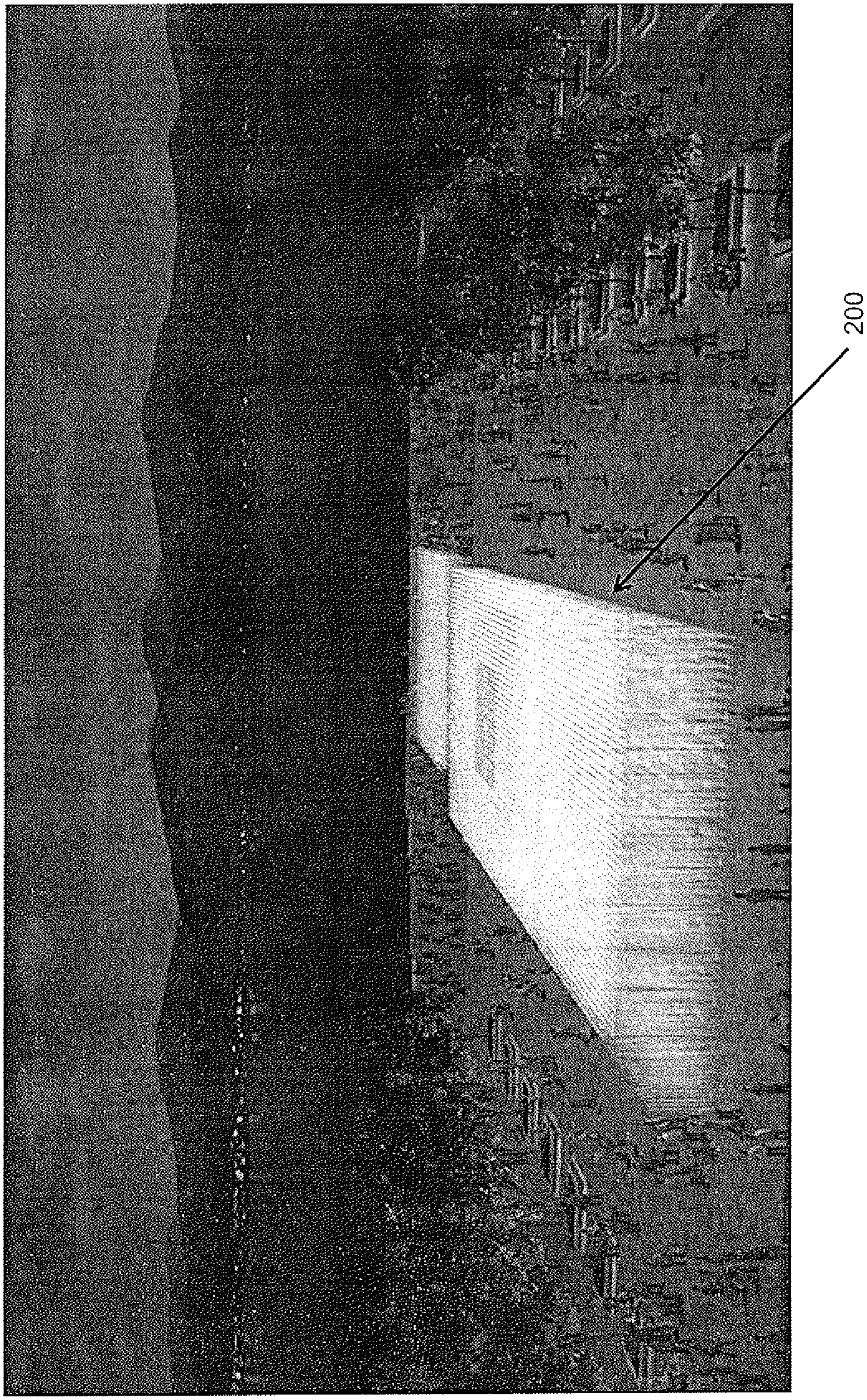

For example, pixels 102 of display 10 may first cumulatively be programmed to emit water stream pixels 202 to form the spiral pinwheel water waveform 200 as shown in FIG. 3A, and then smoothly transition to the spiral pinwheel water waveform 200 as shown in FIG. 3B. After that, the waveform 200 may smoothly transition into the abstract spiral waveform 200 depicted in FIG. 3C and then abruptly transition into the rectangular waveform 200 depicted in FIG. 3D. As such, FIGS. 3A-3D provide an example where control system 300 provides for gradual, smooth transitions followed by an abrupt transition where a number of nozzles 104 are turned on, and previously activated nozzles are adjusted so that the many or all of water stream pixels 202 are at the same height.

Pixels, manifolds or element modules 102 may include other tools or utilities in addition to the nozzles or water jets 104 described above. As noted above, element modules 102 may also include lighting sources 108 that may illuminate water streams 202. An example of this is depicted in FIGS. 3A-3D where display 10 operates at night and water streams 202 are illuminated as shown. The light from lighting sources 108 may be provided by LEDs, fiber optics, light bulbs or other types of lighting devices, and light sources 108 may illuminate water stream pixels 202 with white light, colored light or any combination of thereof. Light sources 108 may also be programmed to turn on or off, change colors, operate in a strobe or other mode, or generally be synchronized with the water stream pixels 202, music or other features, so as to provide a unique and aesthetically pleasing visual feature.

As shown in FIGS. 2 and 4, light sources 108 may be configured to the side of water jets 104. Alternatively, lights 108 may be within water jets 104, or in any other position with respect to water jets 104 that may allow light sources 108 to adequately illuminate water stream pixels 202. Furthermore, pixels 102 may include multiple nozzles, light and/or other tools or utilities. This may increase the resolution of the resulting choreography.

Other elements, tools or utilities that may be provided by pixels 102 include fire, motion sensors or other items. For any such utility that is directed upward, pixel 102 may include an appropriate hole or other passageway. For example, pavers 106 may include an additional hole or opening to accommodate a gas line to produce flame. Pavers 106 may also include motion sensors that may turn off the water, gas and/or other utilities should an observer or other item come close and risk injury.

It is preferred that control system 300 control the utilities and features provided by display 10. In this manner, water, light, flame or other visual effects, music or other acoustical effects, and/or any other effects may be controlled according to the desired choreography. For example, control system 300 may control the foregoing utilities so that they are synchronized with music, the lighting of surrounding buildings or other features. To this end, control system 300 may be operatively connected to each individual manifold 102, e.g., paver 106, to control the features provided thereby. This connection may occur through hardwire or wirelessly. It is also preferred that the water and other features provided by the individual pixels 102 may be controlled remotely by a system administrator or the like. It is also preferred that display 10 may be controlled to provide choreographies that complement the time of day, e.g., day or night, the weather, an event occurring nearby or factors.

In addition, pixels or element modules 102 may also comprise any number of other types of nozzles or water jets 104 such as larger or smaller diameter nozzles that emit larger or smaller diameter water stream pixels 202. In addition, element modules 102 may comprise water misters that may generally emit a water mist that may be choreographed with water stream pixels 202. Other types of nozzles or water jets 104 such as bloom nozzles, fan nozzles, canopy shooters, cone shooters and/or other types of nozzles may be used to add additional characteristics to water waveforms 200. In sum, display 10 of the current invention may provide a variety of characteristics to water waveforms 200 and the overall display 10.

The structure of display floor 100, i.e., element matrix, grid or pixel array 100, is now further described with reference to FIG. 2. As shown, element matrix 100 may comprise generally rectangular element modules 102 configured side-by-side along generally parallel axes. However, grid 100 may be configured with many other pixelated arrangements within the scope of the invention. For example, element matrix 100 may instead comprise pixels 102 that are arranged in a series of concentric circles, a spiral, or other shapes such as triangular, octagonal, sloped, curved or other geometries or groups of shapes.

The manifolds, pixels or element modules 102 comprising element matrix or floor 100 may be supported by lattice structure 120 that is shown in FIG. 2 and that may generally position and support each element module 102 within element matrix 100. Lattice structure 120 is also depicted in FIG. 4 (viewed from above). Lattice structure 120 may include successive side walls or structures 122, successive floors or bottom structures 124 and successive top structures 126, that taken together, form a number of sockets or receptacles to receive, house or accommodate pixels or element modules 102 in a desired fashion to form matrix or grid floor 100.

The sockets formed by side, bottom and top structures 122, 124, 126 may be configured in the same or similar shape as the pixel 102, e.g., paver 106, it will receive or support. In this manner, the sockets of lattice structure 120 may correspond to the geometric shape(s) of the element modules 102 supported by matrix 100. For example, sockets may be square or rectangular to receive square or rectangular pixels 102. Sockets 126 may also have a depth that is the same or similar to the height dimension of pixels 102.

Lattice structure 120 may also support the utilities to be provided to each pixel 102, such as water lines to provide water to nozzles 104, electricity or other lighting mechanisms to provide light to lighting 108, control lines and other utilities. It should also be noted that the side, bottom and top structures 122, 124, 126 may comprise walls, beams, scaffolding or other types of support structures that may adequately support and align element modules 102. In addition, lattice structure 120 may include mechanisms to anchor lattice structure 120 to the ground or foundation underneath display 10 to add stability across the entire structure. A quick release mechanism may also be coupled to any anchoring structure 120 used so that pixel 102 may be removed from structure 120 and floor 100.

In addition, lattice structure 120 may be modular in nature. In the embodiment of FIG. 4, for example, each lattice structure module 130 is indicated by the bolded lines and may include twelve element modules 102 in three rows of four, e.g., twelve pavers 106. For illustrative purposes it can be seen that four lattice modules 130 may be combined to create an element matrix 100 of forty-eight element modules 102.

The lattice structure 120 may be scaled larger than that shown in FIG. 4 to support hundreds or thousands of pixels, manifolds or element modules 102. In addition, each lattice structure module 130 may have alignment and attachment mechanisms such as slots, clips, bolts, rails, guide pins and other types of mechanisms that may facilitate the alignment and attaching of the modules 130 together to form the overall element matrix 100. In addition, each lattice structure module 130 may have joints, jacks, relays and other types of mechanisms to allow for the water supply lines, control lines and power lines to be connected between modules 130, as well as any other connections required for the lattice structure modules 130 to be fully functional when connected and combined. In this way, each pixel or element module 102 within each lattice structure module 130 across the entirety of element matrix 100 may also be properly configured and supplied with water, electricity, gas or other utility.

In an example of scalability, 100 lattice structure modules 130 that each contain 100 element modules 102, e.g., arranged 10×10, may be combined together to form an lattice structure 120 or display floor 100 with ten thousand element pixels, manifolds or modules 102. It should be recognized that each lattice structure module 130 may be formed to support and align any number of element modules 102, and that the modules of lattice structure 120 may be configured in any shape in order to form an element matrix 100 of any desired geometry. In addition, lattice structure 120 need not be modular and may instead comprise a single unit.

It can be seen that the modularity of lattice structure 120 may facilitate the assembly and installation of display 10. That is, instead of having to install and properly align each and every element module 102 at the site location, e.g., by installing grid 100 and then placing each pixel 102 in sockets of matrix 100. The lattice structure 120 may be preassembled with element modules 102 so that the overall assembly may be installed at the site location. In addition, each element module 102 may be configured with its elements including water jets 104, light sources 108, water lines, power lines, control lines, pavers 106 as well as any other elements, such that when the lattice structure modules 130 are combined all the elements required for element matrix 100 are included. In this scenario, the lattice structure modules 130 may be preassembled at one location with element modules 102 and transported to the location of cascading water display 10 to be combined onsite.

As an alternative to, or in combination with, lattice structure 120 described above, a series of foundational elements, piers, beams and/or other supports may be constructed beneath floor 100 of display 10. For example, when display 10 will be located in a plaza or other open space, an appropriately sized hole, trench or depression may be excavated or otherwise formed so that it will be underneath display 10. Alternatively, floor 100 may simply be formed above the existing ground or foundation.

In any event, it is preferred that a reservoir or catch basin is formed or otherwise located under floor 100 to receive water that falls downward after being emitted from nozzles 104. This water may then travel down between pavers 106 or through other gaps or spaces in floor 100. Upon reaching the reservoir or catch basin below display 10, this water may then be recycled by being collected and provided to nozzles 104 for subsequent emission.

An appropriate support structure may be built on the ground or reservoir surface. This support structure may include piers or other support elements that may support pixels 102. To this end, the piers or other support elements may include appropriate fasteners to receive, align and hold pixels 102 in place. The support structure may also include appropriate utility lines and direct them for attachment to pixels 102.

Pixels 102 may comprise an appropriate material through which water nozzles, gas lines, electrical lines and/or other utilities may pass. In one embodiment, the water, gas or other utility may pass through a hole in the material comprising pixel 102 without piping or other mechanisms to transport the utility. In this embodiment, the material comprising pixel or manifold 102 is sufficiently dense so that holes therein take on the characteristics of a pipe, tube or other conduit. Alternatively, holes in pixel 102 may be fitted with pipes, tubes or other conduits to deliver water to a nozzle, gas to an igniter, insulated electrical lines to lighting or other delivery mechanisms.

The dimensions and shapes of pixels 102 may vary, and may depend on the desired spacing and resolution to be provided by water stream pixels 202. The dimensions and shapes of pixels 102 may also vary across display 10, e.g., smaller pixels 102 may reside in one section of display 10 to provide high resolution water stream pixels, while perimeter or peripheral pixels 102 may be larger and/or spaced farther away because resolution is not a primary concern. As noted above, pixels 102 may include multiple nozzles, lights or other tools or utilities to increase resolution per unit area.

Figure 5A:
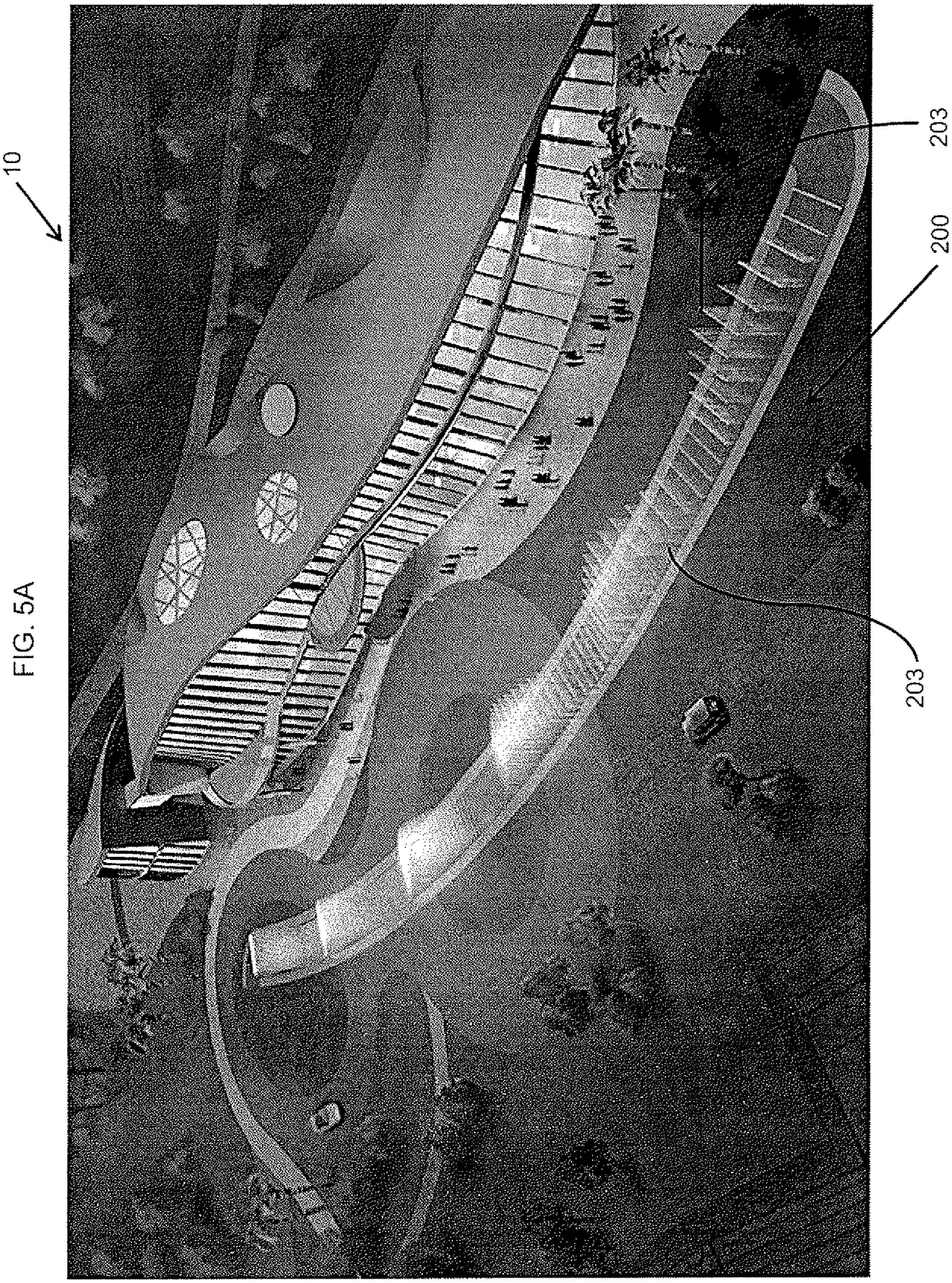
FIGS. 5A-5G are perspective views of a display at different times showing how the display choreography may transition over time.
Figure 5B:
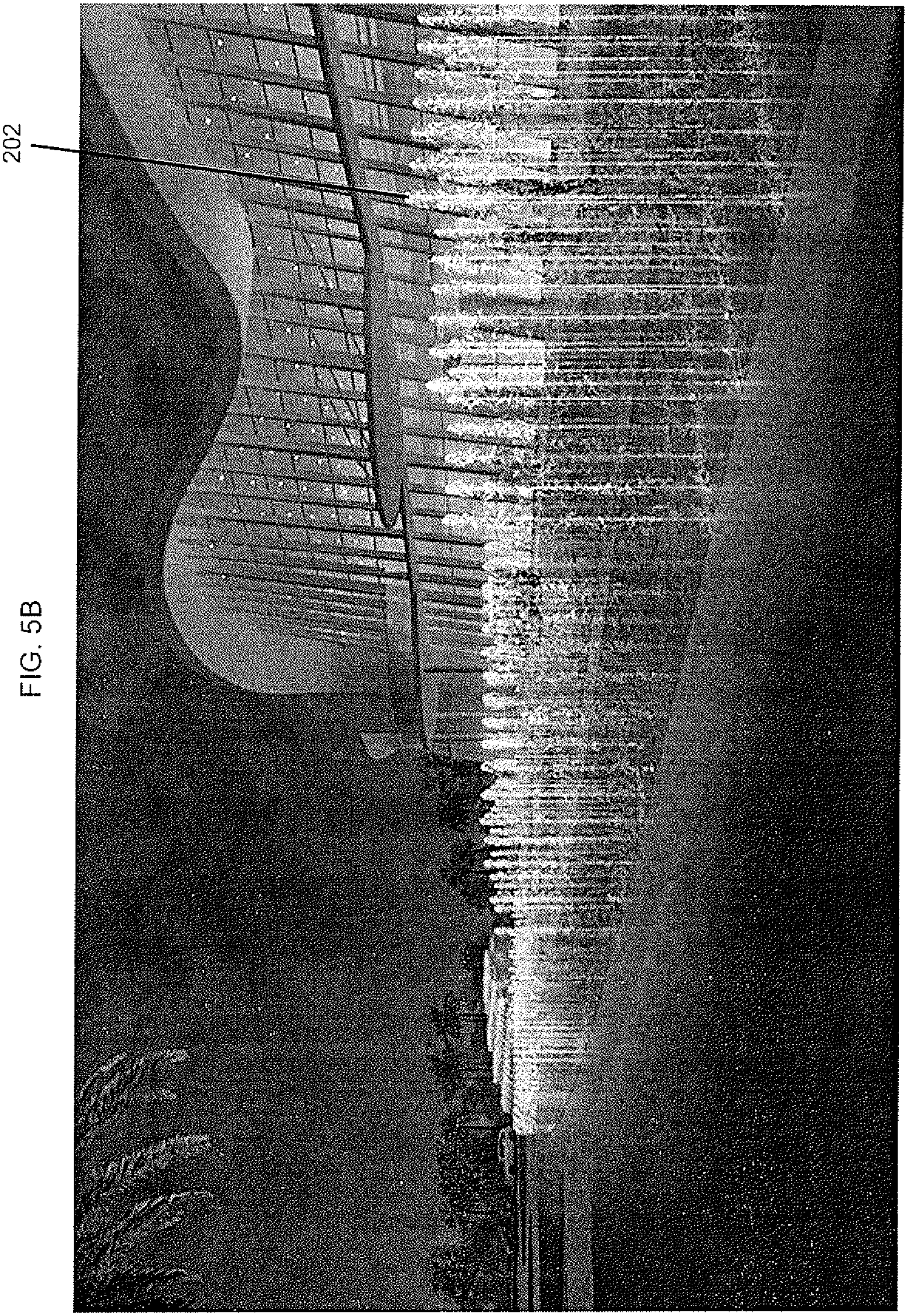
Figure 5C:
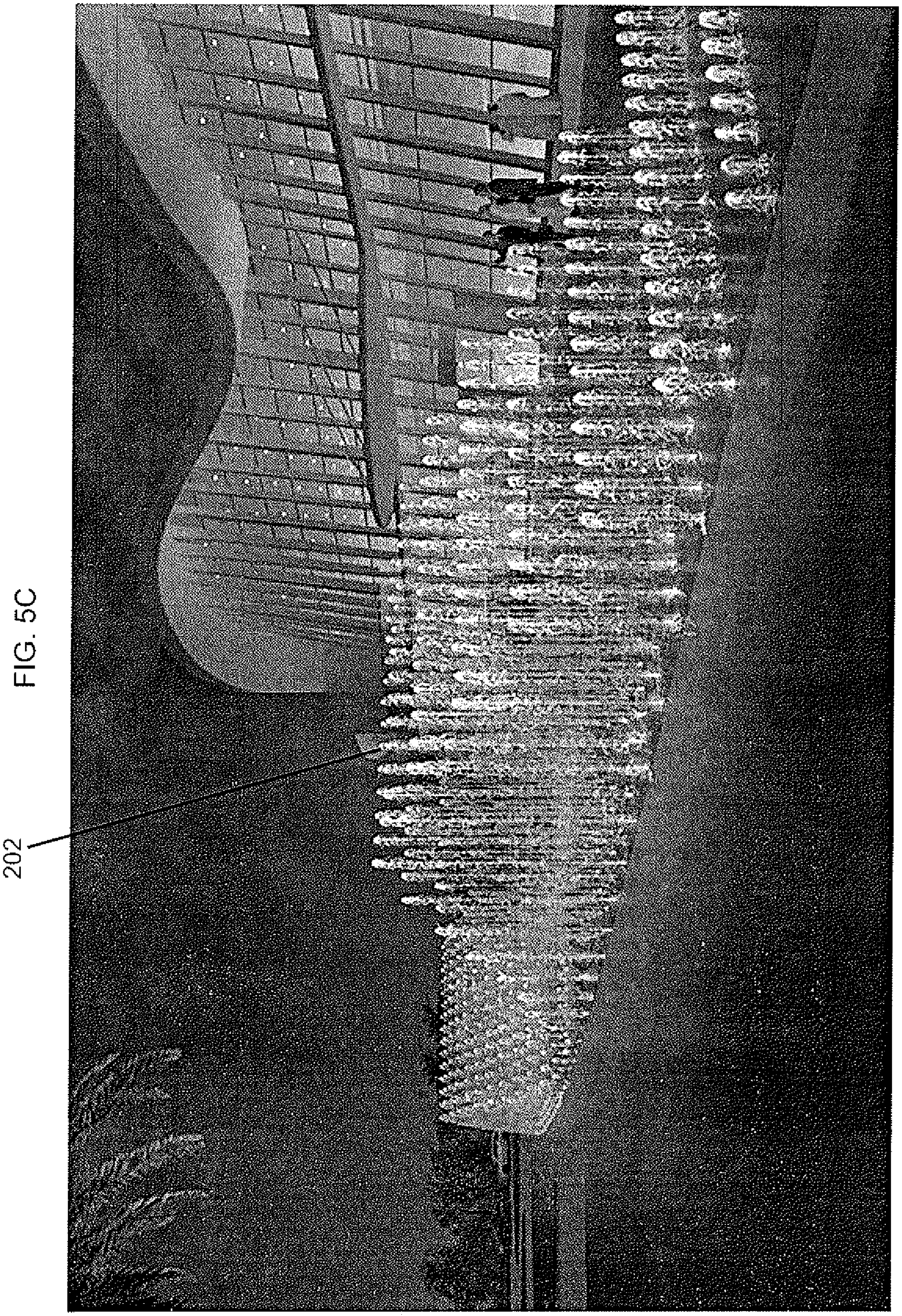

Additional embodiments of display 10 reflecting the current invention are now described. One such embodiment is shown in FIGS. 5A-5H and includes rows 203 of pixelated nozzles 104 and water streams 202, as well as lighting. As shown in FIG. 5A, the rows 203 of pixelated water streams 202 may vary in height so as to resemble a wave. As also shown, each section of the waveform may be lit by a different color. FIGS. 5B and 5C show close-up views of display 10 and the manner in which the height of the pixelated water streams 202 may vary to provide a cascading or undulating appearance. Variations in lighting are also shown.

Figure 5D:
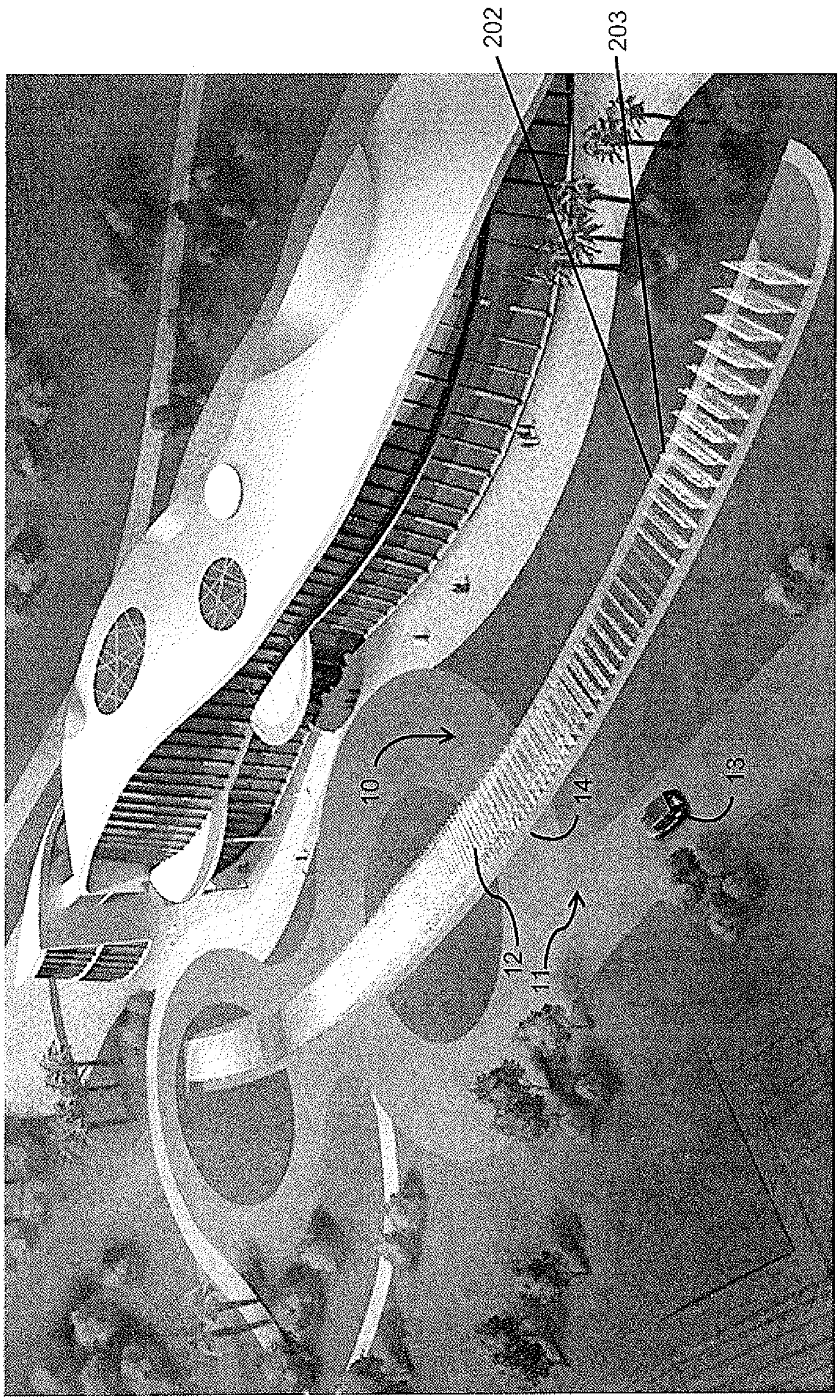
Figure 5E:
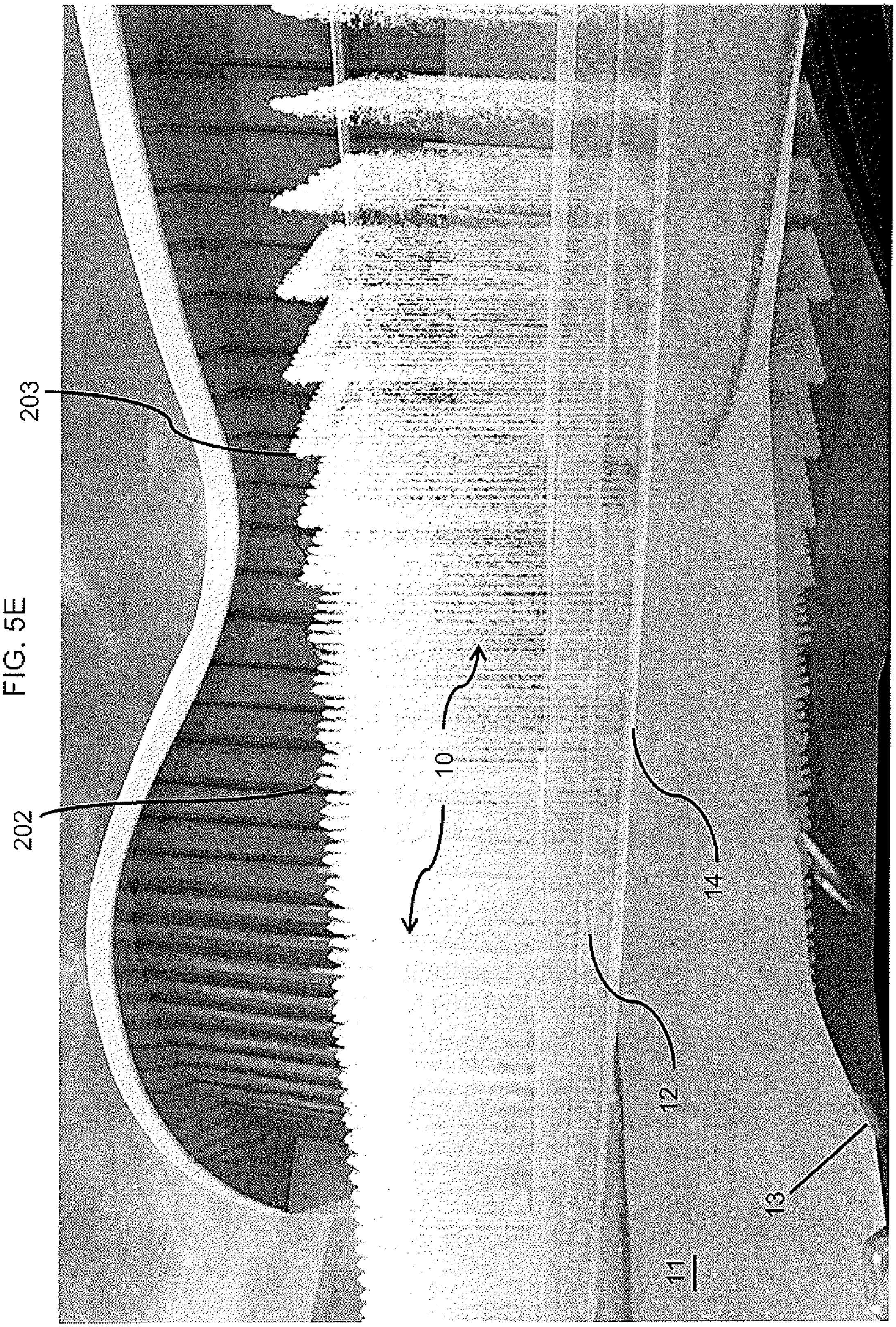
Figure 5F:
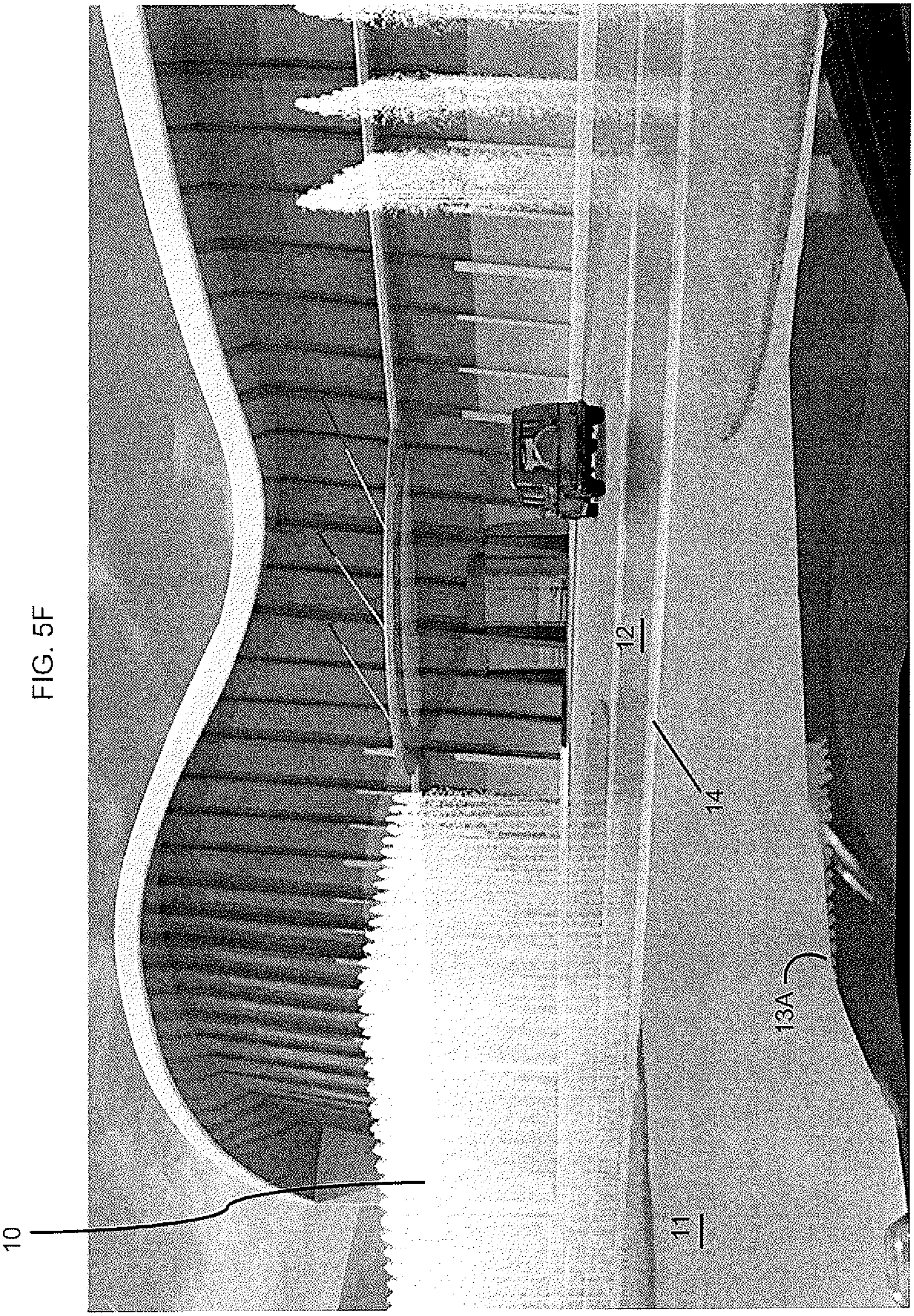

FIGS. 5D-5F show further variations in the appearance of the pixelated water streams 202 and rows 203 in this embodiment of display 10. These figures also show the motion sensor feature noted above. As shown, display 10 may be positioned across or adjacent to driveway 11, wherein driveway 11 has as an overlapping section 12 that crosses over display 10. Certain pixel(s) 14 of display 10 may include weight or motion sensor(s) that may detect when a certain amount of weight presses down on pixel(s) 14 or when a pixel, e.g., a paver 106, is moved laterally because some weight or a force is acting upon it.

As shown in FIG. 5D, vehicle 13 may proceed along driveway 11 toward display 10. As vehicle 13 approaches display 10, the water stream pixels may still be operating across the overlapping section 12. FIG. 5E shows what the driver or passenger(s) of vehicle 13 may observe at this time. As such, display 10 provides a unique driving experience in that it appears that vehicle 13 is headed right into the water stream pixels 202.

However, when vehicle 13 drives over pixel(s) 14 in advance of display 10, the weight of vehicle 13 may press down on pixel(s) 14 thereby engaging the motion sensor contained therein. The motion sensor may, in turn, send a signal to control system 300 which in turn turns off the water streams in overlapping area 12 as shown in FIG. 5F. Alternatively, there may be circuitry and/or a physical switch which may reside within pixel(s) 14 that may serve to turn off the nozzle in the pertinent pixel(s) without the need for signals to be sent to a central control system 300.

Once turned off, the water streams in overlap section 12 may be programmed to remain off to provide vehicle 13 enough time to cross overlap section 12. Alternatively, the water streams in overlap section 12 may remain off until vehicle 13 drives over another motion sensor positioned on the other side of overlap section 12 at a location where vehicle 13 is necessarily clear of display 10. At this point, the nozzles in the overlap section 12 may again safely emit water. To this end, the overlap water stream pixels may emit water streams, e.g., at a particular pressure and/or height, so that the water streams rejoin the choreography of display 10.

As shown in FIG. 5F, a second vehicle 13A may approach display 10 while the overlap water streams are turned off. In this example, vehicle 13A may drive over motion sensor pixels 14 at a time when the overlap water streams remain off, and continue to remain off while successive vehicle 13A crosses through display 10.

Figure 5G:
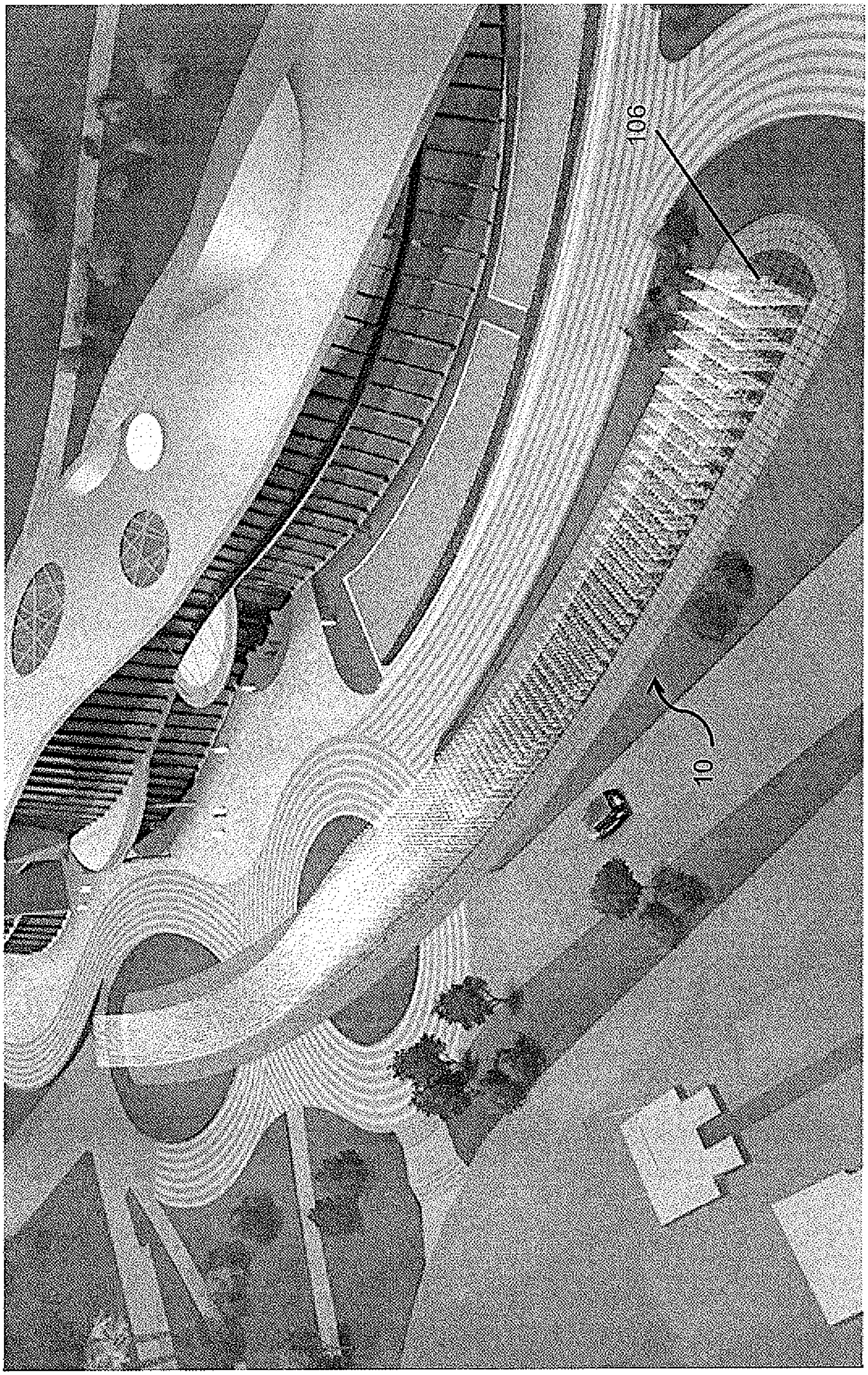
Figure 5H:
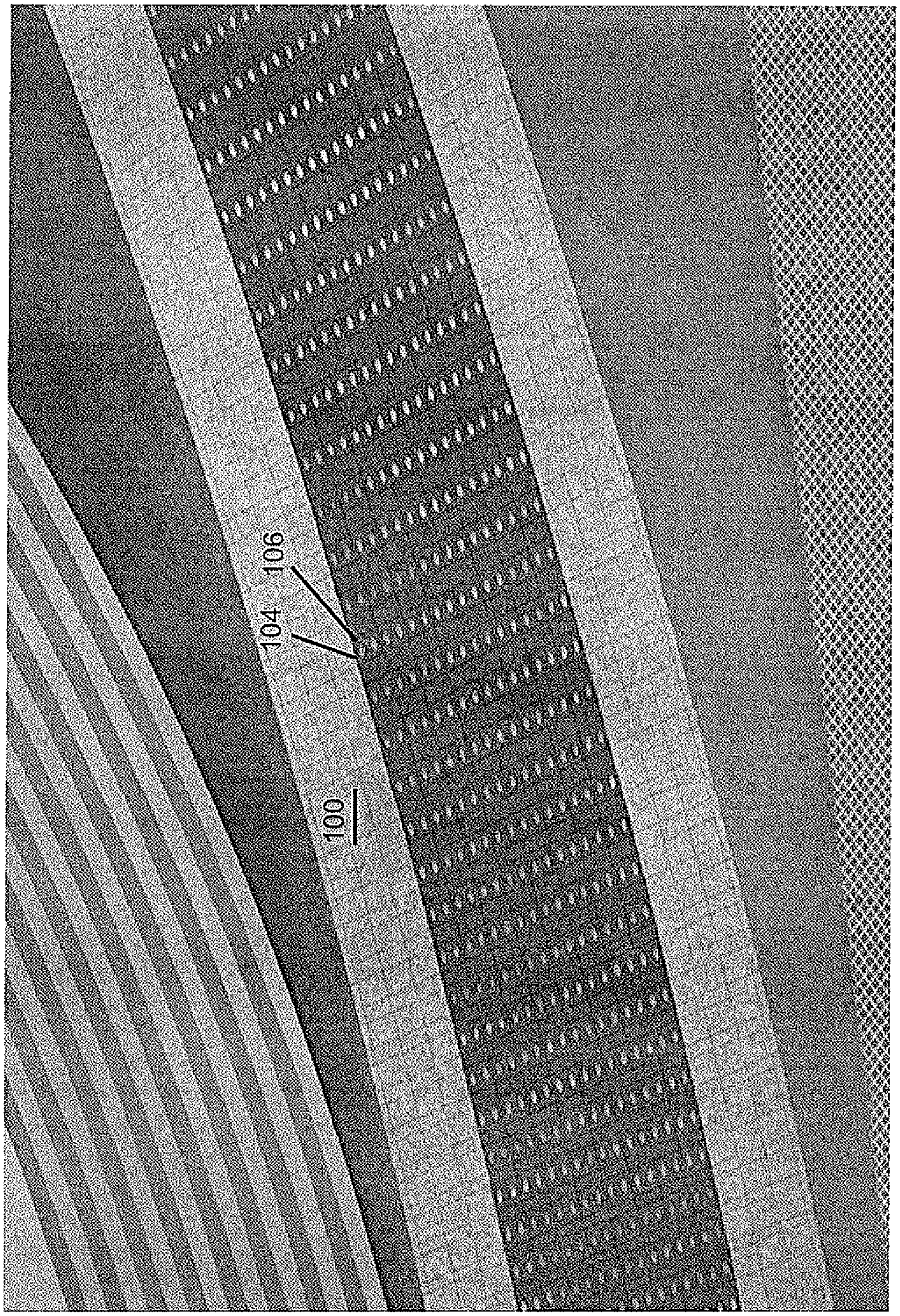
FIG. 5H is a top view of a display showing its pixelated nature.

FIG. 5G shows another variation of the same embodiment of display 10. In this variation, the perimeter of display 10 may comprise additional flooring elements that appear similar to the pixelated pavers 106 that emit water in rows. FIG. 5H is another view of this variation of this embodiment. This view more clearly shows the individual pavers and their openings through which the pixelated water streams are emitted. This view shows how the rectangular shape of the pavers may provide more spacing between nozzles and water streams longitudinally between rows, when compared to the closer spacing between nozzles and water streams in a given row. As such, rows of pixelated water streams may be provided.

Figure 6A:
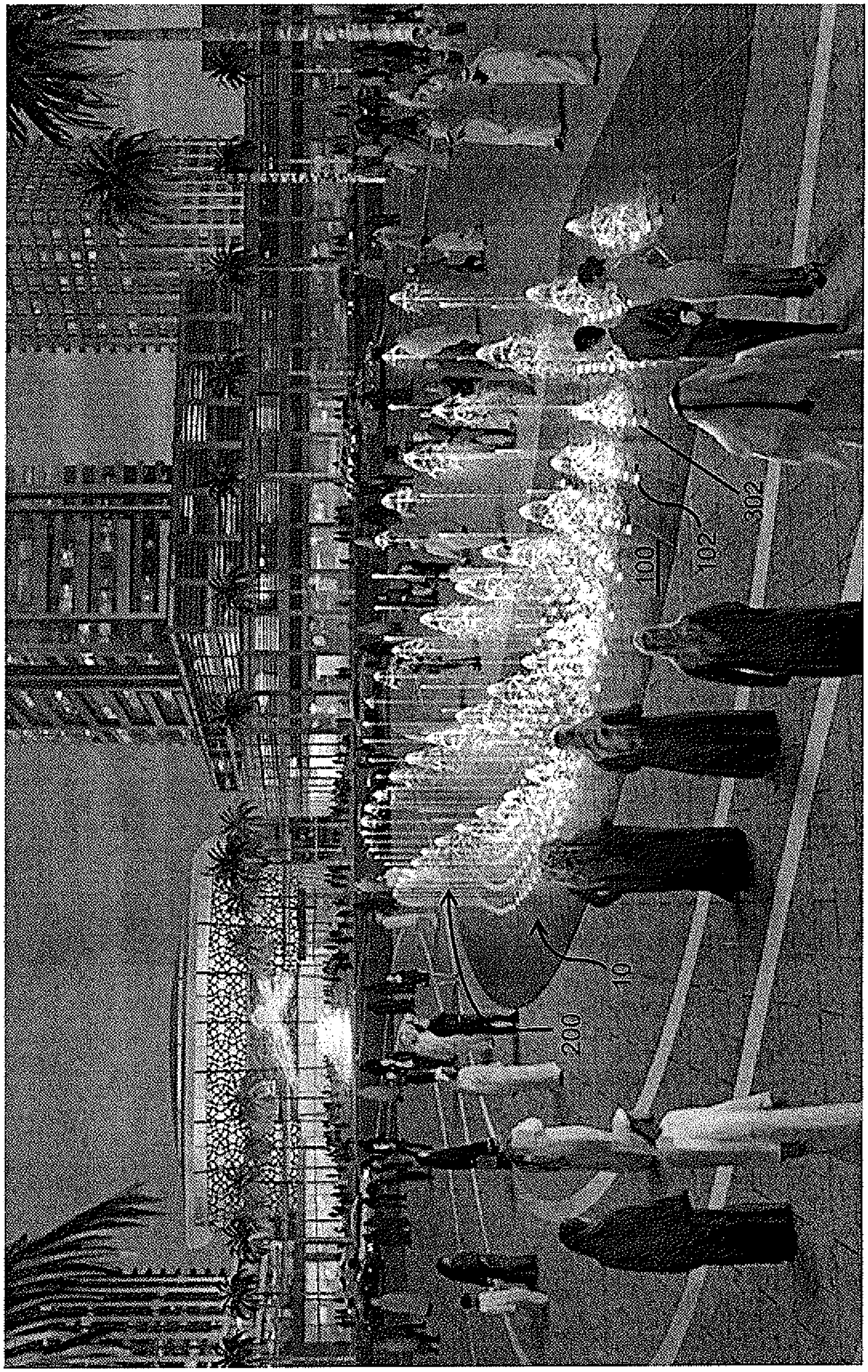
FIGS. 6A-6B are perspective views of a display at different times showing how the display choreography may transition over time.
Figure 6B:
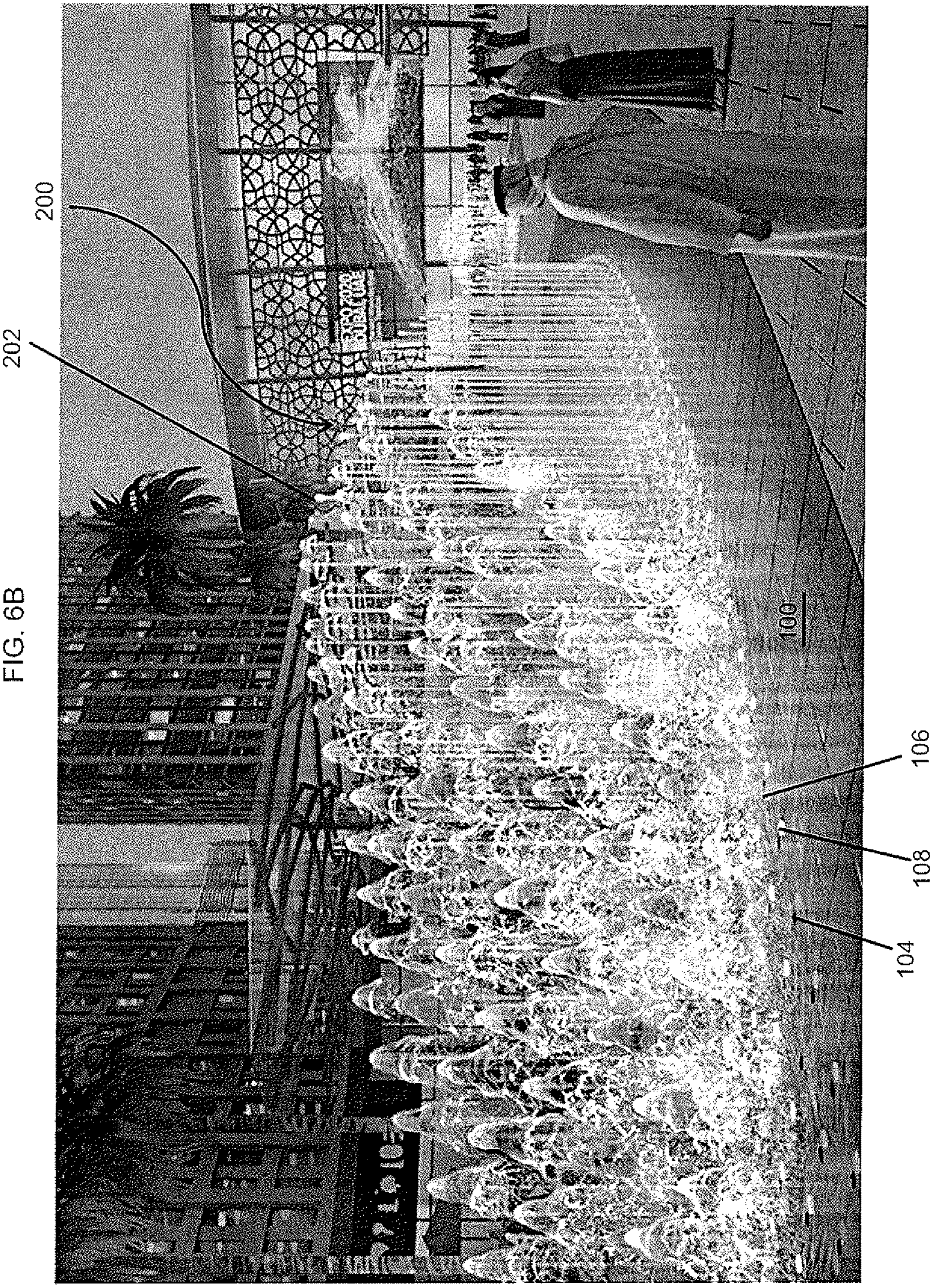

Another embodiment of display 10 reflecting the current invention is now described with reference to FIGS. 6A-6B. As shown, display 10 may include a number of pixels 102 that emit water stream pixels 202 to produce waveform 200. As also shown, pixels 102 may include lighting. As better shown in FIG. 6B, the nozzles 104 may be represented by the dark circles in each paver 106, while the white or other colored circles in each paver represent light sources 108.

Display floor 100 may form part of an overall plaza thereby allowing observers to view and experience display 10 close up. To this end, it is preferred that the nozzles and light sources do not protrude above the top surface of pavers 106, so that observers do not trip on them. As also shown, the height of water streams 202 and lighting may be synchronized to provide a unique and variable choreography.

Another embodiment of display 10 reflecting the current invention is now described with reference to FIGS. 7A-7D. This embodiment again shows how floor 100 of display 10 may form part of an overall plaza and allow observers to view and experience display 10 up close. For example, as shown, observers may walk amongst the water stream pixels.

To provide this observer/display interactivity, pixels 102, e.g., pavers 106, may include motion sensors that may operate similarly to the motion sensor pixels described above. That is, when an observer steps on a pixel 102 emitting water, a motion sensor included in that pixel may cause the nozzle in that pixel to turn off. Alternatively, particular nozzles may turn off when an observer steps on nearby pixels, e.g., pavers 106, so that those particular nozzles turn off in advance of the observer coming too close to the emitted water stream.

It should be noted that pixels 102 designed to sense the weight or movement of people, as opposed to the weight or movement of vehicles, would be programmed or set to turn off the water stream pixel when a lower weight presses down on the pixel. For example, the motion sensor pixels that are configured to sense movement or weight of a person, may be set to turn off a water stream if the lower weight of a child presses down on the pixel. In addition to water, the motion sensor pixel may also be configured to turn off other utilities such as flame-producing gas, lighting, etc.

The motion sensors of certain pixels may be alternatively programmed or set to turn on a utility when an observer steps on those pixels. For example, an observer stepping on a certain pixel (that itself may or may not be configured to emit water or other effects) may activate another pixel in a different section of display 10, e.g., causes a nozzle to emit water, causes lighting to illuminate, etc.

In another motion sensor alternative, an observer stepping on a certain pixel may cause some other number of pixels to emit water in a particular choreography. And if other certain pixels are stepped on, the choreography may change. That is, the motion sensors in these pixels may send signals to control system 300 that may cause controller 302 to generate signals which cause other pixels to emit water, shine light or provide other features in choreographed fashion. As such, an observer may control the choreography of display 10.

Figure 7A:
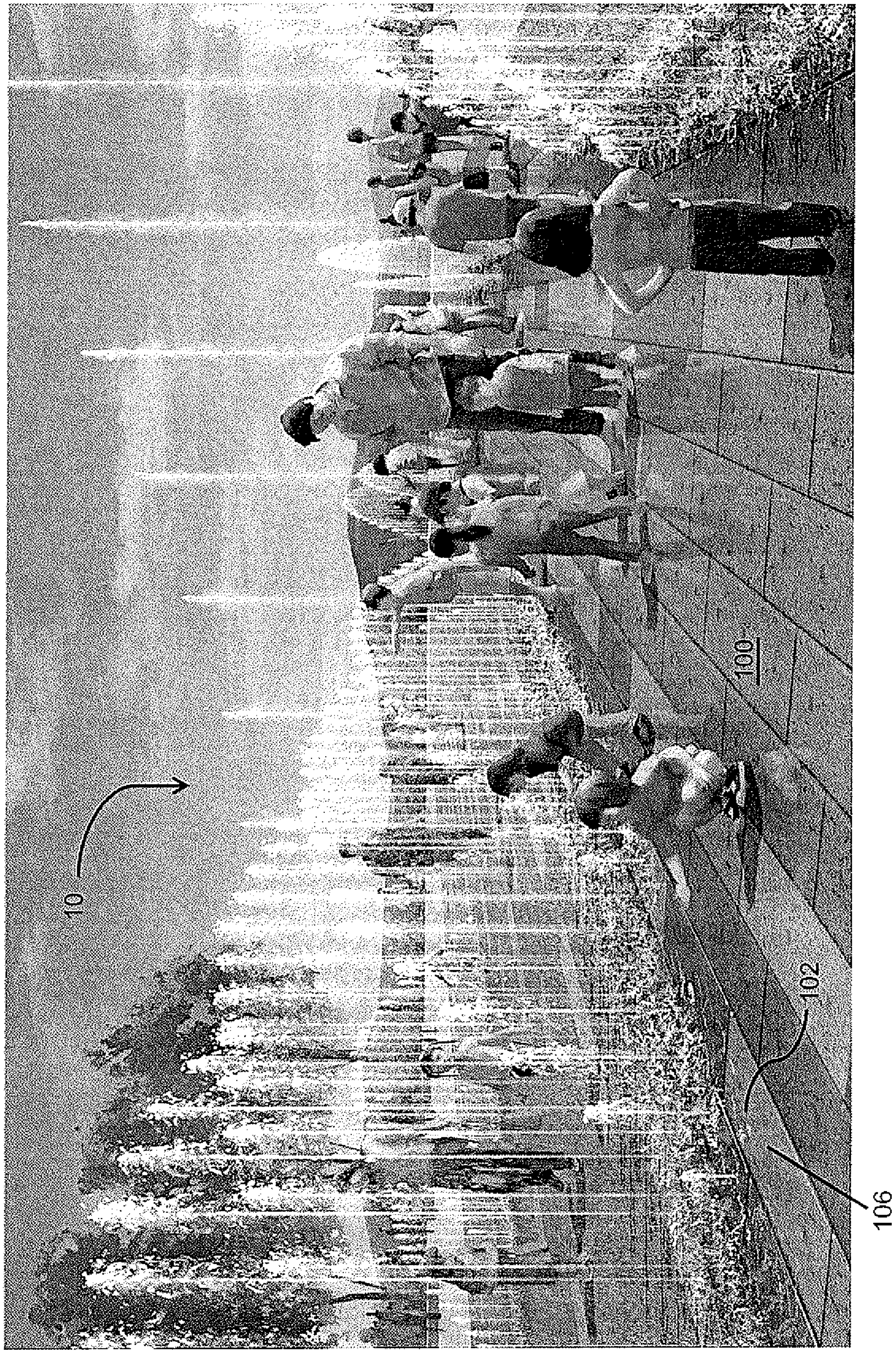
FIGS. 7A-7D are perspective views of a display at different times showing how the display choreography may transition over time and showing how observers may interact with the display.
Figure 7B:
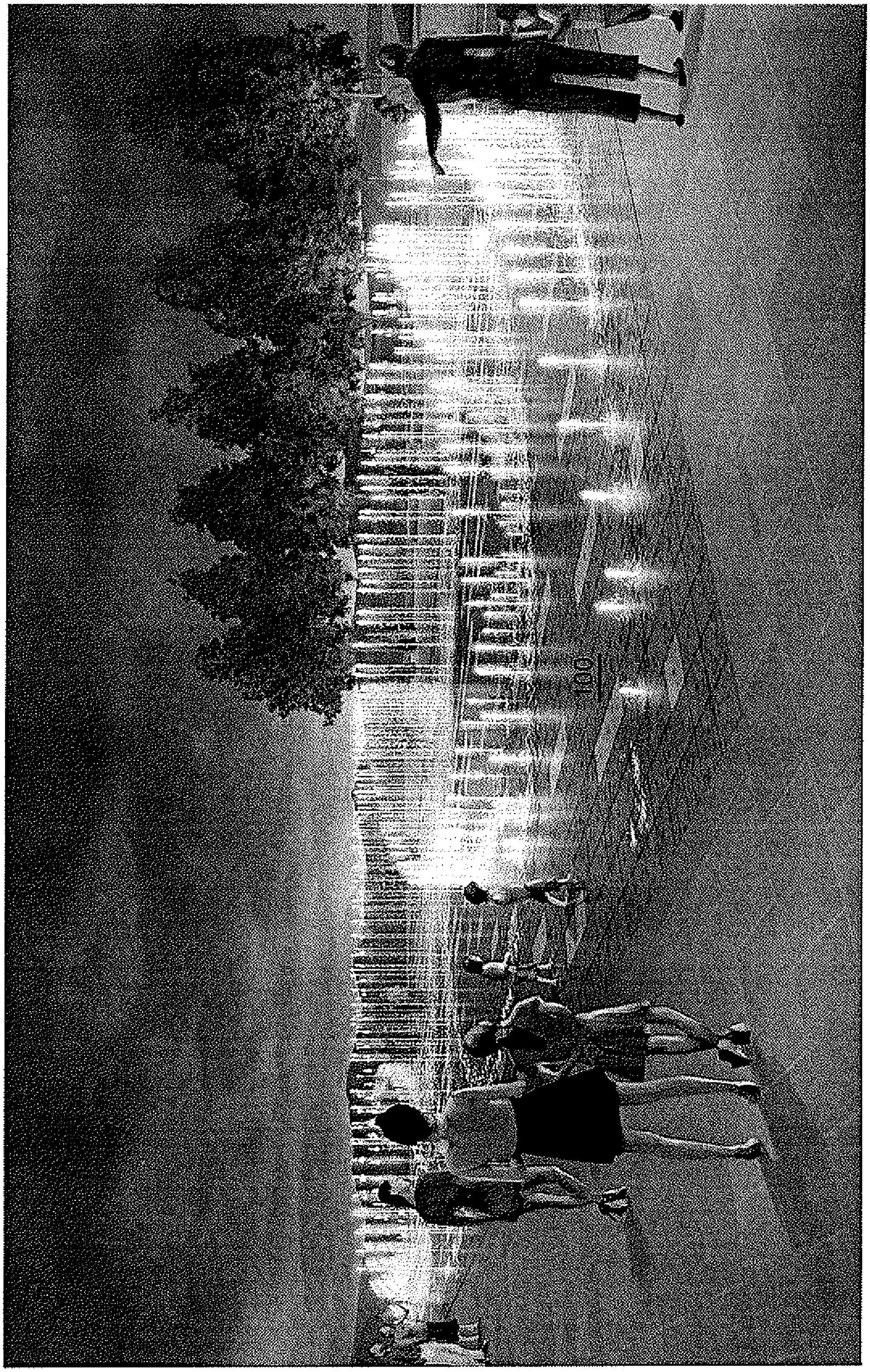
Figure 7C:
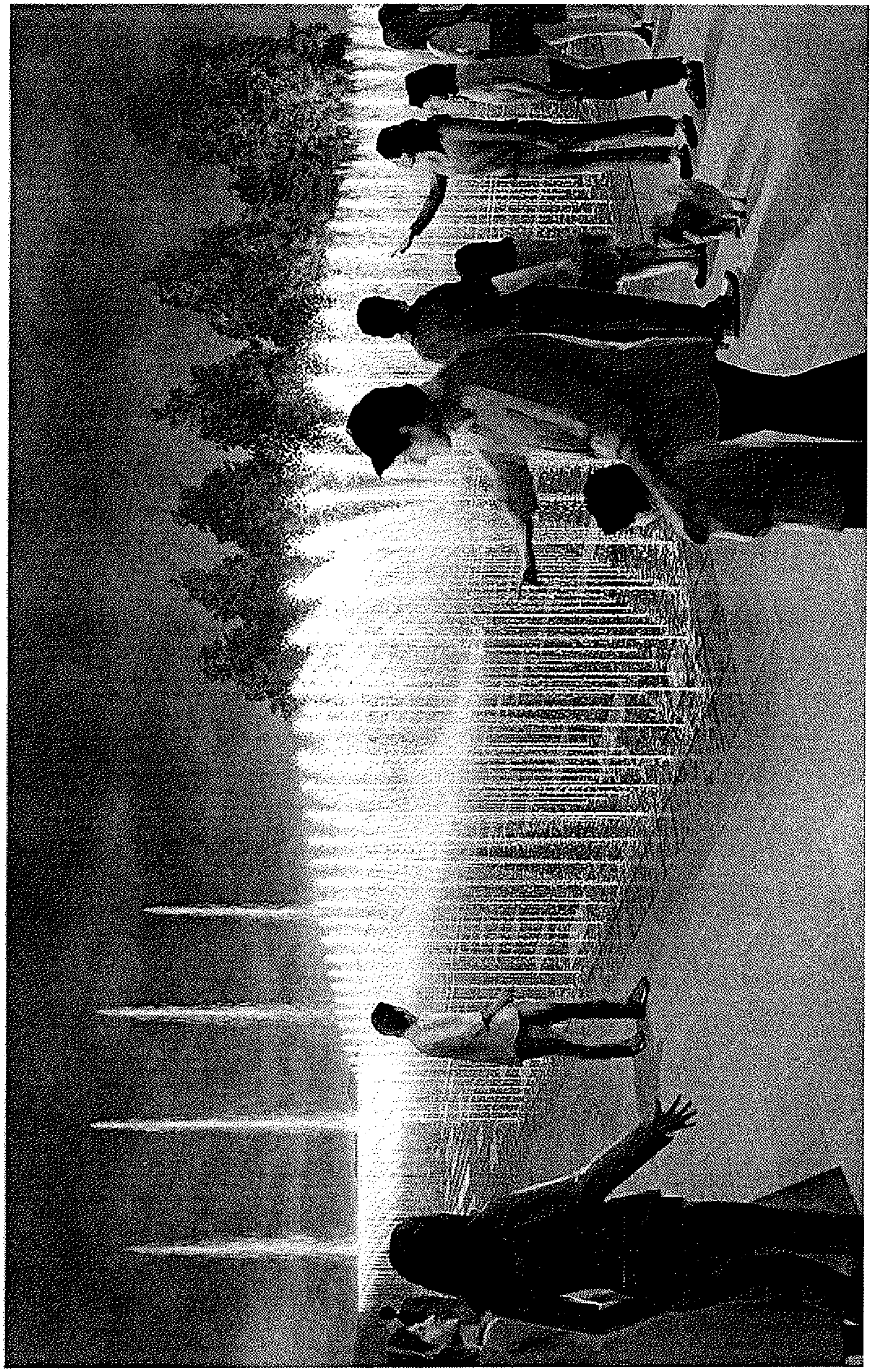
Figure 7D:
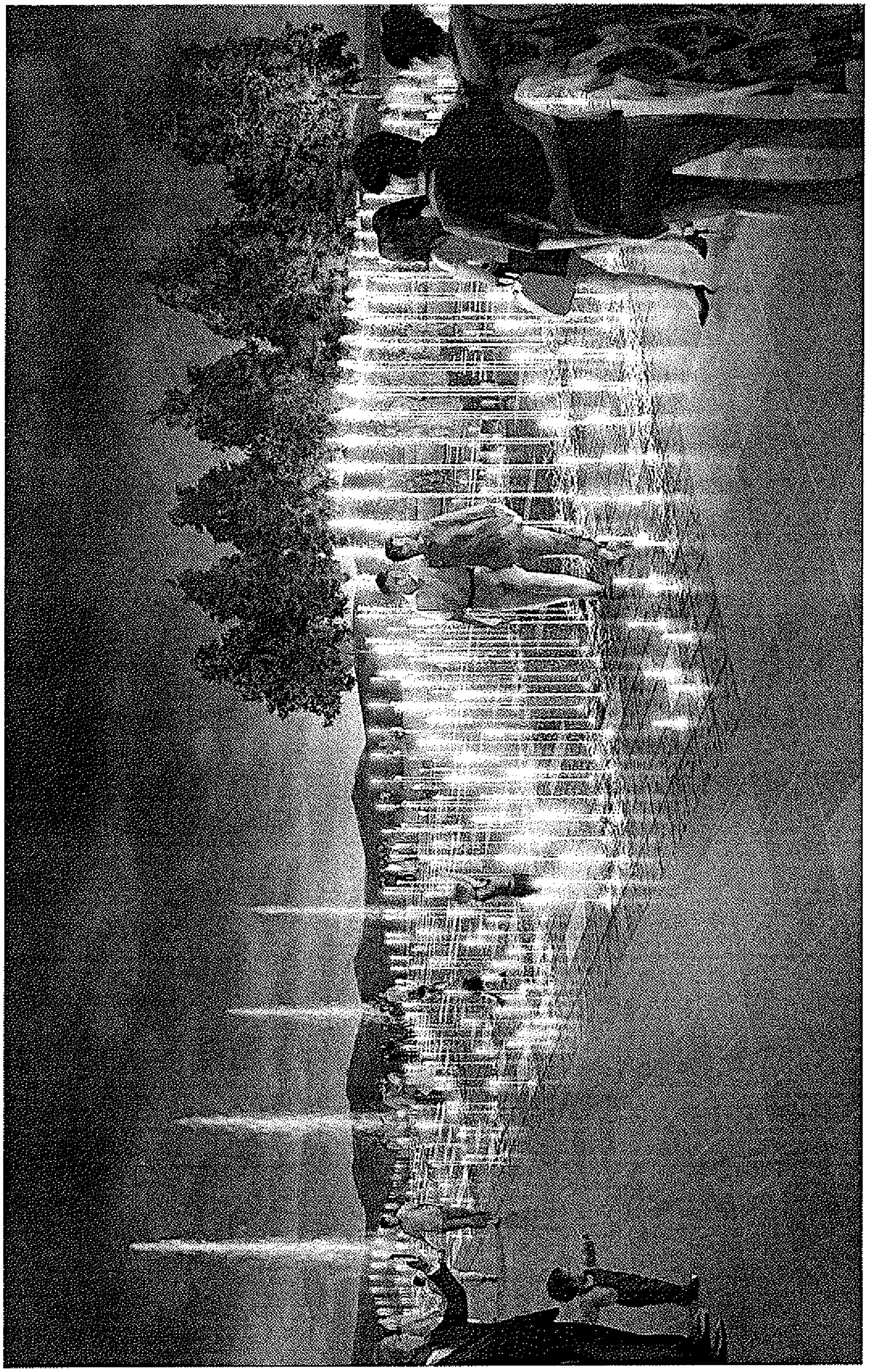

The embodiment of FIGS. 7A-7B also shows another unique feature of the current invention regarding the separation or compartmentalization of different sections of display 10. As shown, observers may be surrounded by pixelated water streams so that they are separated or compartmentalized from other observers or from the rest of display 10. The creation of walls of pixelated water streams may depend on where the observer is located and where that observer's weight is pressing down on certain pixels. Also, observers may walk through display 10, and as they proceed, walls of pixelated water streams may form to continually surround them.

Another aspect of the current invention relating to the design, simulation and control of display 10 and choreographies provided thereby is now described. As discussed below, this aspect of the invention may involve software. The following discussion makes reference to FIGS. 8A-8C.

As stated in earlier sections, control system 300 and/or controller 302 may individually control water jets 104, light sources 108 and other utilities and/or features of the pixels, manifolds or element modules 102 included in display 10. To this end, controller 302 may include software that may be designed and programmed to operate display 10 to provide a desired choreography. This software that controls display 10 may also reside at a remote location and control display 10 by providing commands over the internet or other network.

The software may also serve as a design tool to enable a user to configure, operate, maintain, troubleshoot and/or otherwise control the various components of display 10 while creating water waveforms 200 and display choreography in the first place. The software may also include one or more graphical user interfaces (GUI) that may enable a user to easily navigate and utilize the various tools that the software may include. As discussed below, this software may generally allow the user to design the choreography of display 10, to simulate or present this choreography to guide the design and/or development process, and to revise and further develop this choreography and overall appearance to be provided by display 10.

For example, the software may enable a designer or other user to set up a virtual replica of display 10 on a visual monitor of controller 302, or another monitor used during the design process, in order to virtually design the water waveforms 200 that display 10 may produce. This may entail the user interacting with one or more GUIs to choose the types, quantities and locations of the various water jets 104 (also referred to in this software description as water nozzles), light sources 106 and other elements within each pixel, manifold or element module 102 across the virtual element matrix 100.

Once configured, the user may utilize tools within the software to then choreograph the sequencing of the various elements within the display 10 to create three-dimensional visual replicas of water waveforms 200 on the monitor of controller 302. Then, once the waveforms are designed, the software may also have the ability to physically control water jets 104, light sources 106 and other elements of display 10 when in actual operation to create the same water waveforms 200 across the actual display 10 as had been provided during the design process.

Figure 8A:
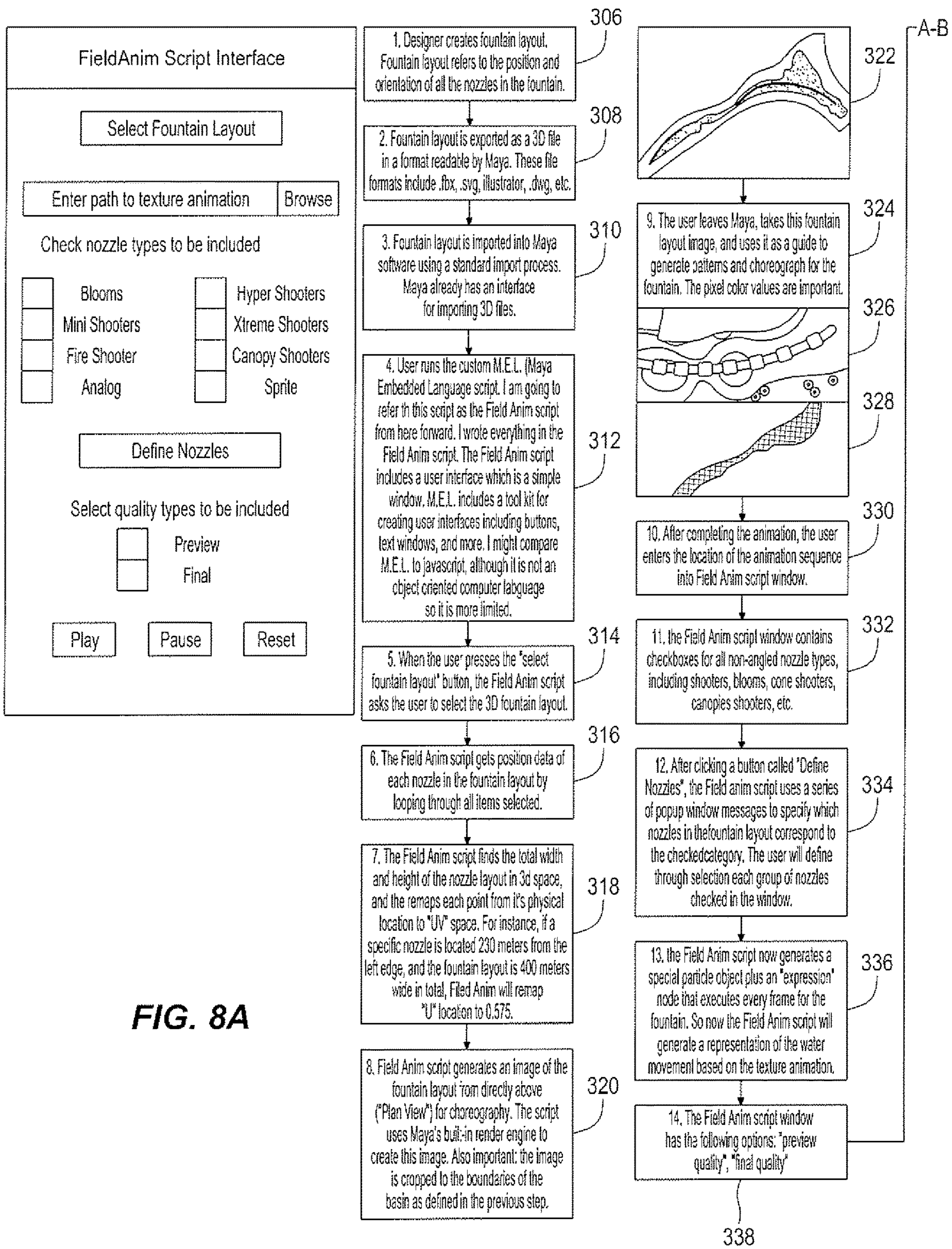
FIGS. 8A-8C show a flowchart regarding a tool to aid in the design and/or presentation of a display, and to also facilitate control over a display in operation.
Figure 8B:
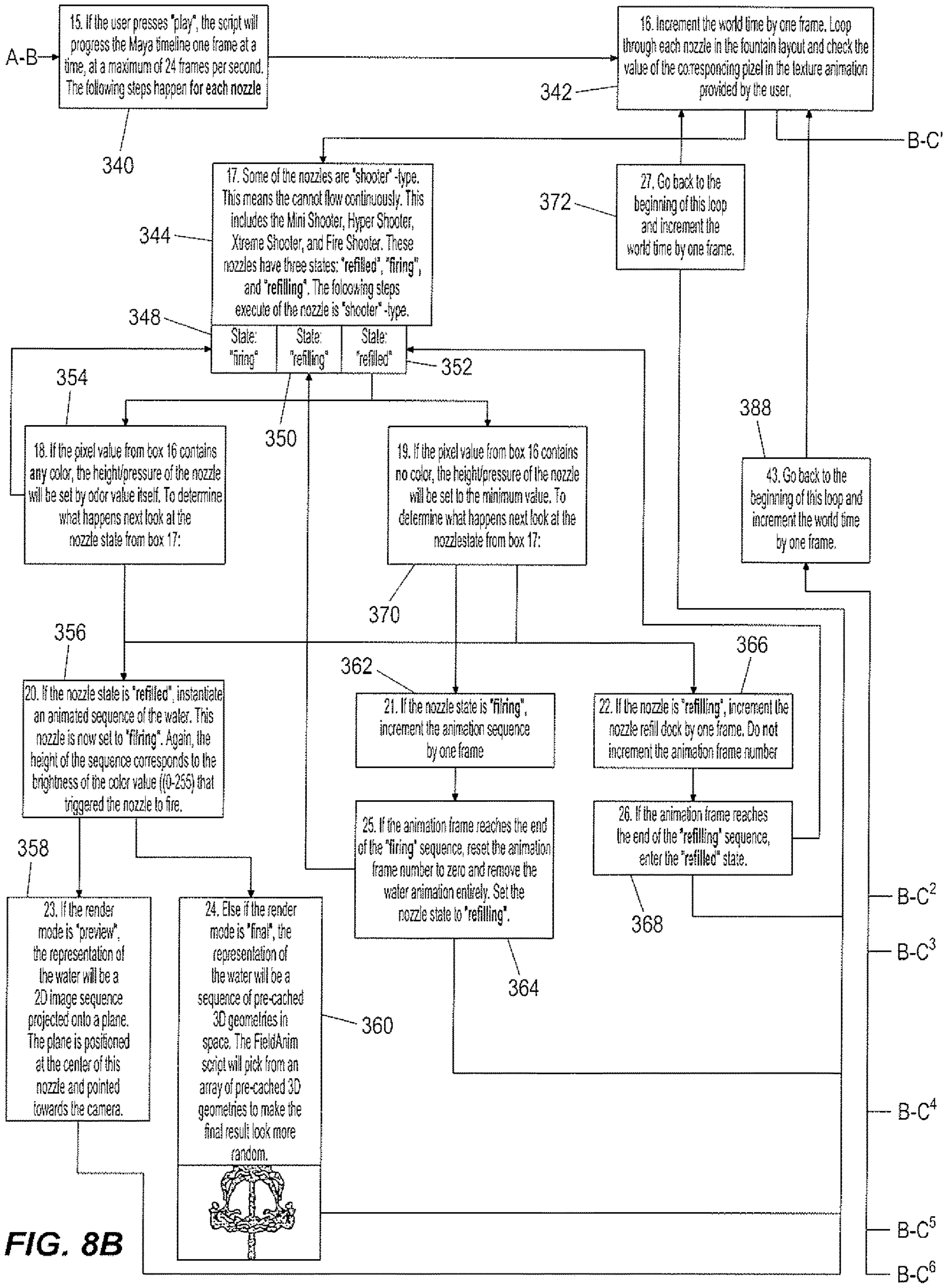
Figure 8C:
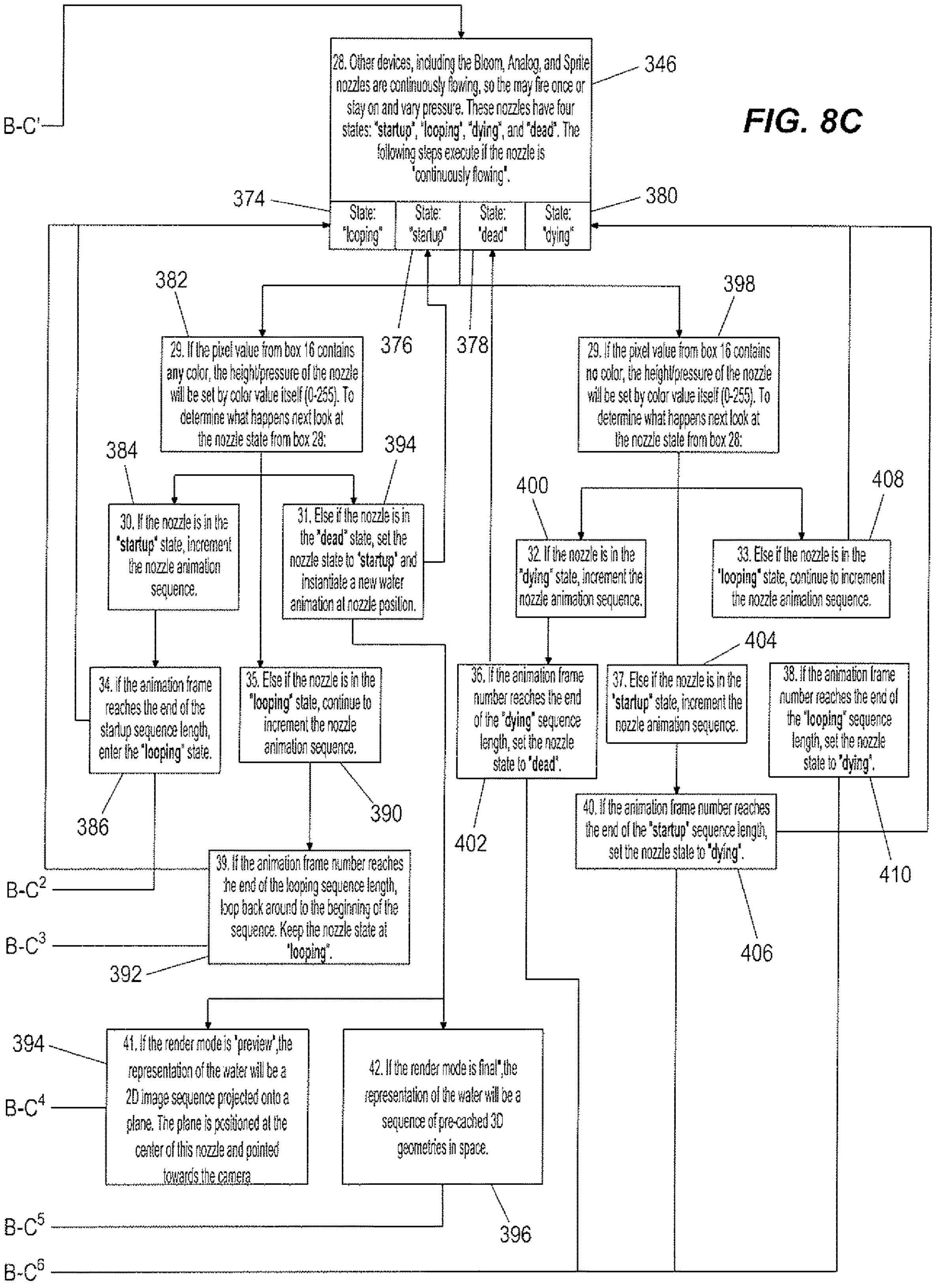

Turning now to FIGS. 8A-8C, the details of this software are now further described. To begin, the user may initiate the software such that GUI 304 may be displayed. Note that GUI 304 is shown to be representative of the types of interfaces that may be employed by the software and that other control interfaces may be utilized within the scope of the current invention. GUI 304 or another appropriate GUI may be displayed by a computer that the developer user is using during the design process.

As shown in step 306, the user may begin by creating a general layout of display 10 within the software whereby the layout may include the type, position and orientation of each nozzle within display 10. This may be accomplished by creating the layout directly within the software, by importing a predesigned layout from a stored location or by any other methods or combination of methods.

Next, as shown in step 308, the layout may be exported from the first software program to another software program that may also running on controller 302 or another computer used by the designer. Note however that the first and second software programs do not necessarily need to be separate and in fact may be combined into one or more programs. In addition, more than one controller 302 within control system 300 or other computer may be utilized to run any number of different software programs. The software programs may be created using any number of computer languages such as Maya, JavaScript, OpenGL or other types of languages. Also, if the software is written using Maya, it may be preferable for the layout file to be in a file format such as fbx, .svg, illustrator, .dwg, or other types of formats that may be compatible. In a preferred embodiment, the layout file may be directly imported into Maya using a standard import process but other processes may be used as well.

The user may run a script within the software to import the layout file (steps 310 and 312) and may begin creating the water waveforms. For purposes of the discussion herein, this script is referred to as the FieldAnim script but other names may be used. In a preferred embodiment, the FieldAnim script is a Maya Embedded Language (MEL) script, but this is not required within the scope of the current invention.

Upon running the script, GUI 304 may be displayed to the user to assist in the ensuing steps. For example, as shown in steps 312 and 314, the user may click on the "Select Fountain Layout" button on GUI 304 and follow the instructions to import the layout file. Note that GUI 304 may be created in MEL utilizing its native toolset for creating user interfaces, or it may be created using different programs.

After the layout file has been imported into FieldAnim, the script may loop through all the elements included in the layout to calculate the total width, length, height and overall geometry of each element within the layout in a three-dimensional space, and then remap each point from its known physical location to a virtual two-dimensional "UV" space (where "U" and "V" represent the axes of the 2-dimensional space) within the program (steps 316 and 318). For example, if the fountain layout is 400 meters wide and a particular water jet is physically located 230 meters from the left edge, the FieldAnim script may remap that particular water jet's "U" location to 230 m/400 m or 0.575.

At this point, the FieldAnim script may utilize the remapping information to render the data and generate an image of the fountain layout within the program (step 320). The rendering of the fountain layout may then be displayed on the monitor of the controller 302 or other computer as shown in step 322 to be used for the choreography of the water waveforms. Note that the image may be cropped to the boundaries of the water display basin as defined in the previous steps.

Next, as shown in step 324, the user may leave the Maya program and utilize the fountain layout file within an animation software program to create the water waveform patterns and choreography for the fountain 10. The resultant images may resemble the images shown in steps 326 and 328, with the different surfaces and contours of the water waveforms being represented by different pixel color values (with values ranging from 0-255).

It should be noted that each pixel color value may represent a different state of the water nozzle (as described in more detail in later sections). After completing the animation, the user may use GUI 304 to enter the location of the animation sequence file into the FieldAnim script by clicking the "Browse" button and navigating to the file location in the "Enter path to texture animation" field (step 330).

Next, the user may check certain boxes in GUI 304 corresponding to the names of various elements to choose different types of water nozzles and other elements that may be included in the particular layout (step 332). These elements may include Bloom nozzles, Mini Shooters, Fire Shooters, Analog nozzles, Hyper Shooters, Xtreme Shooters, Canopy Shooters, Sprite nozzles and other type of elements.

The user may then click the "Define Nozzles" button of GUI 304 and the FieldAnim script may then utilize a series of popup window messages to allow the user to specify which nozzles in the fountain layout may correspond to each checked category of nozzles or elements (step 334). These popup "wizards" may act as a guide for the user to define each element chosen.

In order to generate a full virtual representation of the water waveform movement based on the texture animation created in the above steps, it is preferable to know and control the specific state of each virtual nozzle defined above for each frame of the choreography sequence. To accomplish this, the FieldAnim script may generate a special particle object for each virtual nozzle. For reference, an "object" as defined in object-oriented programming is an instance of a class that is defined with self-contained variables, methods and subroutines that may run and update with every new frame of the animation sequence. These subroutines will be described in further detail in sections below. Also note that if Maya is being used, it may be preferable to create an expression node for each virtual nozzle that may act as an object for each nozzle as defined above.

The GUI 304 within FieldAnim script may next allow the user to preview the choreography of the water waveforms using options that may include "preview quality" and "final quality" (step 338). If the user presses "Play" on GUI 304, the script may progress the Maya timeline one frame at a time to perform the animation sequence (step 340). It should be noted that the sequence may progress at a rate of twenty four frames per second, but other speeds may also be utilized. During this sequencing, for each frame increment, the script may loop through each nozzle in the fountain layout to check the value of the corresponding color pixels in the texture animation file designed and provided by the user (step 342).

At this point, it should be noted that there may be one or more categories of water nozzles employed in display 10. One category may contain water nozzles that are "shooter" type nozzles that may not flow continuously but instead may shoot bursts of water at incremental moments in time (shown in step 344). That is, the nozzles may fill up with water, may shoot the water, and may then refill. Given this, these nozzles may have different states that may include "refilled", "firing" and "refilling" (shown in boxes 348, 350 and 352 respectively). The water nozzles that may be included in this category may include the Mini Shooter, the Hyper Shooter, the Xtreme Shooter, the Fire Shooter and other types of shooter nozzles.

A second type of water nozzle may include nozzles that may flow continuously (shown in step 346). These nozzles may fire once in a burst or may fire and remain on with a continuous stream that may be varied in pressure, height, width and in other characteristics of the stream. These nozzles may have different states that may include "startup", "looping", "dying" and "dead" (shown in boxes 374, 376, 378 and 380). The water nozzles that may be included in this category may include the Bloom nozzle, the Analog nozzle, the Sprite nozzle and other types of water nozzles.

Given that there may be at least two different categories of water nozzles, each with different characteristics and states, the software may preferably monitor and control the different categories using different methodologies to optimize the overall control of display 10. Therefore, this description will first describe the monitoring and control of the "shooter" type of nozzles and then the nozzles that may flow continuously.

For "shooter" type nozzles, the FieldAnim script may first check the pixel color value of each nozzle individually (step 354) and then act accordingly. The ensuing description will describe the sequence that may be performed for a single nozzle which may be scaled to represent the sequencing that may be performed for all the nozzles of the display 10 in unison. If upon checking the pixel color value of the nozzle, it is found that the pixel value contains any color (step 354), the height/pressure setting of the nozzle may be set to the value of the pixel color value. After this, the script may check the state of the nozzle to determine what to perform next (boxes 348, 350 and 352). If the state of the nozzle is "refilled" (step 356), the script may initiate an animated sequence of the water and the state of this nozzle may be set to "firing". The height of the sequence may correspond to the brightness of the color pixel (0-255) that initially triggered the nozzle to fire.

Next, the script may check to see if the render mode is set to "preview" (step 358) or to "final quality" (step 360). If the mode is set to "preview" the representation of the fountain water waveform may be a two-dimensional image sequence projected onto a plane with the plane positioned at the center of the nozzle and pointed towards the user/camera (step 358). If however the render mode is set to "final quality", the representation of the water waveform may be a sequence of pre-cached three-dimensional geometries in space to form the complete waveform flow (step 360). The FieldAnim script at this point may pick the geometries from an array of pre-cached three-dimensional geometries such that the overall rendering appears natural. After step 358 or step 360 is performed, the script may loop back to the beginning and increment the sequence clock by one frame and repeat (step 372).

Returning to step 354, if, however, the nozzle state is determined to be "firing" instead of "refilled", the animation sequence may be incremented forward one frame as shown in step 362. Next, if the animation frame reaches the end of the "firing" sequence, the animation frame number may be set to zero and the water animation may be removed entirely. Then, the nozzle state may be set to "refilling" as shown in step 364.

If, however, the nozzle state in step 354 is "refilling" as shown in step 366, then the nozzle refill clock may be incremented by one frame while the animation frame may be held constant (not incremented). Next, if the animation frame reaches the end of the "refilling" sequence, then the state may be changed to "refilled" (step 368). After step 364 or step 368 is performed, the script may loop back to the beginning and increment the sequence clock by one frame and repeat (step 372).

Returning to step 344, if the pixel color value contains no color as shown in step 370, the height/pressure of the water nozzle may be set to the minimum value and the state of the nozzle may be checked again. Then if the nozzle state is determined to be "firing" in step 370, the animation sequence may be incremented forward one frame as shown in step 362.

Next, if the animation frame reaches the end of the "firing" sequence, the animation frame number may be set to zero and the water animation may be removed entirely. Then, the nozzle state may be set to "refilling" as shown in step 364. If however the nozzle state in step 370 is determined to be "refilling" as shown in step 366, then the nozzle refill clock may be incremented by one frame while the animation frame may be held constant (not incremented).

Next, if the animation frame reaches the end of the "refilling" sequence, then the state may be changed to "refilled" (step 368). After step 364 or step 368 is performed, the script may loop back to the beginning and increment the sequence clock by one frame and repeat (step 372).

Returning to step 342, the sequence of control events will now be described for the continual flow type of water nozzles that may be included in cascading water display 10 as described in step 346. Moving next to step 382, if the pixel color value from step 342 for the continual flow water nozzle that is being sequenced contains any color, then the height/pressure of the nozzle may be set to the color value itself (0-255). Then, the script may check the nozzles state in boxes 374, 376, 378 and 380 to determine the next course of action.

If the nozzle is in the "startup" state as shown in step 384, then the script may increment the nozzle animation sequence one frame and recheck the nozzle's state. Once the animation frame reaches the end of the "startup" sequence length as shown in step 386, the nozzle's state may then be changed to "looping" and the script may return to the beginning of the loop and increment the sequence clock by one frame and repeat (step 388).

If, however, after step 382, the nozzle is determined to be in the "looping" state (step 390), the nozzle animation sequence may be incremented until the frame number reaches the end of the looping sequence length as shown in step 392. At this point, the sequence may be looped back around to the beginning of the sequence with the nozzle state remaining at "looping". The script may then return to the beginning of the loop and increment the sequence clock by one frame and repeat (step 388).

If, however, upon checking the nozzle's state in step 382, the nozzle is in the "dead" state as shown in step 394, the nozzle state may be set to "startup" and a new water animation may be initiated at the nozzle position. If the render mode is "preview", the representation of the water waveform may be a two-dimensional image sequence projected onto a plane that may be positioned at the center of the nozzle and pointed towards the user/camera (step 394). If, however, the render mode is "final", the representation of the water waveform may be a sequence of pre-cached three-dimensional geometries in space (step 396).

Moving back to step 346, if the pixel color value from step 342 has no color, then the height/pressure of the nozzle may be set to the minimum value (step 398). Then, the script may check the nozzle's state in boxes 374, 376, 378 and 380 to determine the next course of action.

Upon checking, if the water nozzle is in the "dying" state, the script may increment the nozzle animation sequence as shown in step 400. Then, once the animation frame number reaches the end of the "dying" sequence length, the nozzle state may be set to "dead" (step 402) and the script may then return to the beginning of the loop and increment the sequence clock by one frame and repeat (step 388).

If, however, the water nozzle is in the "startup" state after step 398, the nozzle animation sequence may be incremented as shown in step 404. Then, once the animation frame number reaches the end of the "startup" sequence length, the script may set the nozzle's state to "dying" as shown in step 406, and the script may then return to the beginning of the loop and increment the sequence clock by one frame and repeat (step 388).

If, however, upon checking the nozzle's state in step 398, the water nozzle is determined to be in the "looping" state, the script may continue to increment the nozzle animation sequence as shown in step 408. Then, once the animation frame number reaches the end of the "looping" sequence length, the script may set the nozzle's state to "dying" as shown in step 410 and the script may then return to the beginning of the loop and increment the sequence clock by one frame and repeat (step 388).

It should be noted that while the above description regards the sequencing of a single water nozzle, whether the nozzle may be a shooter type or a continual flow type, the software preferably performs such sequences for each nozzle contemplated for in display 10 in unison or otherwise efficiently. As such, the foregoing design tool may efficiently evaluate and display the overall contemplated waveforms and choreography of display 10 during development, even where display 10 includes a large number of nozzles and/or other utilities.

An advantage of this aspect of the current invention is that it preferably saves significant time during the design process. That is, the software allows the user developer to observe a simulation of the contemplated choreography of display 10 to determine whether the appearance is in line with desired goals or not. If so, the developer may continue on in the design process, including the development and/or assembly of hardware. If not, the developer may revise the design information input into the software and view the resulting revised display and choreography.

When the software provides the desired choreography, it is preferred that it may also be used to control the actual physical display. That is, the commands and/or instructions provided by the software to present the simulation may also be used to control the water emitted from the nozzles and/or control any other utilities or features included in display 10.

Although certain presently preferred embodiments of the invention have been described herein, it will be apparent to those skilled in the art to which the invention pertains that variations and modifications of the described embodiments may be made without departing from the spirit and scope of the invention. It is intended that the claims herein be interpreted to cover any such modifications. It is further intended that the present invention be not limited according to any particular disclosed embodiment, but rather only according to the appended claims.

Although certain presently preferred embodiments of the invention have been described herein, it will be apparent to those skilled in the art to which the invention pertains that variations and modifications of the described embodiments may be made without departing from the spirit and scope of the invention. It is intended that the claims herein be interpreted to cover any such modifications. It is further intended that the present invention be not limited according to any particular disclosed embodiment, but rather only according to the appended claims.

What is claimed is:

1. A water display configured to provide a performance, comprising:

a plurality of pixels that are arranged in a matrix, wherein at least some of the pixels are water stream pixels that each include a water delivery device to emit a water stream, that are located adjacent to each other, that have a small form factor which reduces their footprint so that the water delivery devices of adjacent water stream pixels are spaced closely together so that the water streams emitted from their water delivery devices are in close proximity to each other or visually blend together, thereby resulting in a high density of pixelated water streams per unit area, and thereby forming a high resolution water waveform; and a controller that controls emission of the pixelated water streams to form the high resolution water waveform, and that further controls emission of the pixelated water streams to transition from the high resolution water waveform to successive high resolution water waveforms;

wherein transitions between the successive high resolution water waveforms provides a choreography during the performance of the water display;

to transition from the first visual water waveform to form a second visual water waveform.

2. The water display of claim 1, wherein the water delivery devices of the water stream pixels include a nozzle, a jet or other device to emit the water stream.

3. The water display of claim 1, wherein at least some of the pixels include a light source that is positioned to illuminate at least some of the high resolution water waveform or successive high resolution water waveform.

4. The water display of claim 3, wherein at least some of the water stream pixels include a light source that is positioned to illuminate at least some of the successive high resolution water waveforms.

5. The water display of claim 2, wherein at least some of the water stream pixels include multiple water delivery devices thereby increasing density of pixelated water streams per unit area, and thereby increasing the resolution of the high resolution water waveform.

6. The water display of claim 1, wherein the controller varies heights of the pixelated water streams to transition between successive high resolution water waveforms and thereby provide the choreography during the performance.

7. The water display of claim 6, wherein the choreography includes the pixelated water streams successively lowering or raising to provide a cascading appearance.

8. The water display of claim 1, wherein the density of the pixelated water streams varies at different locations in the display.

9. The water display of claim 1 wherein each pixelated water stream includes a top water portion and wherein the controller controls emission of the pixelated water streams so that their top water portions blend together to form the high resolution water waveform or a successive high resolution water waveform.

10. The water display of claim 1 wherein the controller controls emission of the pixelated water streams so that transitions between successive high resolution water waveforms are gradual and smooth thereby providing a cascading or undulating wave choreography.

11. The water display of claim 1, wherein the controller controls the emission of each water pixelated water stream individually.

12. The water display of claim 1, wherein the some of the pixels comprise a paver having a hole through which the water delivery device extends.

13. The water display of claim 1, wherein the controller controls the height, width, velocity and direction of each individual pixelated water stream.

14. The water display of claim 13, wherein the controller transmits control signals to valves, actuators and pumps to control the emission of the pixelated water streams.

15. The water display of claim 14, wherein the controller transmits the control signals sufficiently fast so that the transformation between successive high resolution water waveforms is smooth and free of abrupt distortions.

16. The water display of claim 1, wherein the controller stores multiple choreographies, one of which may be chosen for a performance.

17. The water display of claim 1, further comprising light sources, wherein the controller controls how the light sources illuminate the pixelated water streams.

18. The water display of claim 1, further comprising 10,000 pixels, wherein 5,000 of the pixels are water stream pixels, and wherein the size of the display contributes to the high resolution of the water waveforms and successive water waveforms.

19. The water display of claim 1, further comprising a lattice structure that supports the pixels.

20. The water display of claim 1, further comprising a reservoir this is located under the matrix and that receives water that falls downward from the pixelated water streams.

* * * * *